(12) United States Patent
Kinoshita

(10) Patent No.: US 9,836,214 B2
(45) Date of Patent: *Dec. 5, 2017

(54) PORTABLE TERMINAL AND CONTROL METHOD THEREFOR

(71) Applicant: KYOCERA CORPORATION, Kyoto (JP)

(72) Inventor: Kenta Kinoshita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 373 days.

This patent is subject to a terminal disclaimer.

(21) Appl. No.: 14/633,128

(22) Filed: Feb. 26, 2015

(65) Prior Publication Data

US 2015/0220267 A1    Aug. 6, 2015

Related U.S. Application Data

(63) Continuation of application No. 12/443,454, filed as application No. PCT/JP2007/068858 on Sep. 27, 2007, now Pat. No. 8,997,015.

(30) Foreign Application Priority Data

Sep. 28, 2006  (JP) .................................. 2006-264866
Sep. 28, 2006  (JP) .................................. 2006-265060
Apr. 13, 2007  (JP) .................................. 2007-106200

(51) Int. Cl.
  *G06F 3/048* (2013.01)
  *G06F 3/0488* (2013.01)
  (Continued)

(52) U.S. Cl.
  CPC ........ *G06F 3/04886* (2013.01); *G06F 3/0416* (2013.01); *G06F 3/0481* (2013.01);
  (Continued)

(58) Field of Classification Search
  CPC ...... G06F 3/041; G06F 3/048; G06F 3/04883; G06F 3/0416
  See application file for complete search history.

(56) References Cited

U.S. PATENT DOCUMENTS 5,956,020 A    9/1999  D'Amico et al.
6,340,979 B1   1/2002  Beaton et al.
(Continued)

FOREIGN PATENT DOCUMENTS

EP      1457870 A2    9/2004
JP      02-008923 A   1/1990
(Continued)

OTHER PUBLICATIONS

Supplementary European Search Report; PCT/JP2007/068858; dated Jul. 2, 2014.
(Continued)

*Primary Examiner* — Rashawn Tillery
(74) *Attorney, Agent, or Firm* — Studebaker & Brackett PC

(57) ABSTRACT

When it is discriminated by an input-means determining unit that an input to display unit is a first input by a pen, a function of an application allocated in advance to an area on a screen of the application specified by an input coordinate of first input means determined by an input-position determining unit is executed on the basis of the first input. When it is discriminated that the input to the display unit is a second input by a finger, the execution of the function of the application allocated in advance on the screen of the application is prohibited and a predetermined function not allocated to the area on the screen of the application is executed on the basis of the second input.

4 Claims, 24 Drawing Sheets

(51) Int. Cl.
*G06F 3/041* (2006.01)
*G06F 3/0481* (2013.01)
*G06F 3/0484* (2013.01)

(52) U.S. Cl.
CPC ...... *G06F 3/04842* (2013.01); *G06F 3/04883* (2013.01); *G06F 2203/04808* (2013.01)

(56) References Cited

U.S. PATENT DOCUMENTS

| | | |
|---|---|---|
| 6,611,258 B1 | 8/2003 | Tanaka et al. |
| 7,202,860 B2 | 4/2007 | Ogawa |
| 7,532,206 B2 | 5/2009 | Morrison et al. |
| 7,847,789 B2 | 12/2010 | Kolmykov-Zotov et al. |
| 8,089,470 B1 | 1/2012 | Schediwy et al. |
| 8,997,015 B2 * | 3/2015 | Kinoshita ............. G06F 3/0416 345/156 |
| 2003/0085871 A1 | 5/2003 | Ogawa |
| 2006/0125803 A1 | 6/2006 | Westerman et al. |
| 2007/0226636 A1 | 9/2007 | Carpenter et al. |
| 2010/0013792 A1 | 1/2010 | Fukushima |

FOREIGN PATENT DOCUMENTS

| | | |
|---|---|---|
| JP | 04-060715 A | 2/1992 |
| JP | 07-160398 A | 6/1995 |
| JP | 09-311756 A | 12/1997 |
| JP | 10-155038 A | 6/1998 |
| JP | 10-228350 A | 8/1998 |
| JP | 10-336346 A | 12/1998 |
| JP | 11-265240 A | 9/1999 |
| JP | 11-272423 A | 10/1999 |
| JP | 2000-250710 A | 9/2000 |
| JP | 2000-284912 A | 10/2000 |
| JP | 2001-084086 A | 3/2001 |
| JP | 2001-344062 A | 12/2001 |
| JP | 2003-114755 A | 4/2003 |
| JP | 2003-157144 A | 5/2003 |
| JP | 2005-115714 A | 4/2005 |
| WO | 99/28811 A1 | 6/1999 |
| WO | 03/065192 A1 | 8/2003 |

OTHER PUBLICATIONS

Japanese Office Action; JP2011-126562; dated Sep. 17, 2013.
Chinese Office Action; CN200780036425.6; dated May 17, 2013.
Japanese Office Action; JP2011-126562; dated Mar. 5, 2013.
Chinese Office Action; CN200780036425.6; dated Oct. 31, 2012.
Japanese Office Action; JP2006-264866; dated Jun. 12, 2012.
Chinese Office Action; CN200780036425.6; dated Mar. 21, 2012.
Japanese Office Action; JP2011-126562; dated Dec. 6, 2011.
Chinese Office Action; CN200780036425.6; dated Dec. 13, 2011.
Korean Office Action; KR10-2010-7026895; dated Oct. 31, 2011.
Japanese Office Action; JP2006-264866; dated Sep. 27, 2011.
Japanese Office Action; JP2011-126562; dated Aug. 2, 2011.
Korean Office Action; KR10-2009-7006472; dated Sep. 30, 2010.
International Search Report and Written Opinion of the International Searching Authority; PCT/JP2007/068858; dated Jan. 8, 2008.

* cited by examiner

FINGERTIP : CONTACT AREA IS LARGE
PEN : CONTACT AREA IS SMALL

FIG. 3A
FIG. 3B
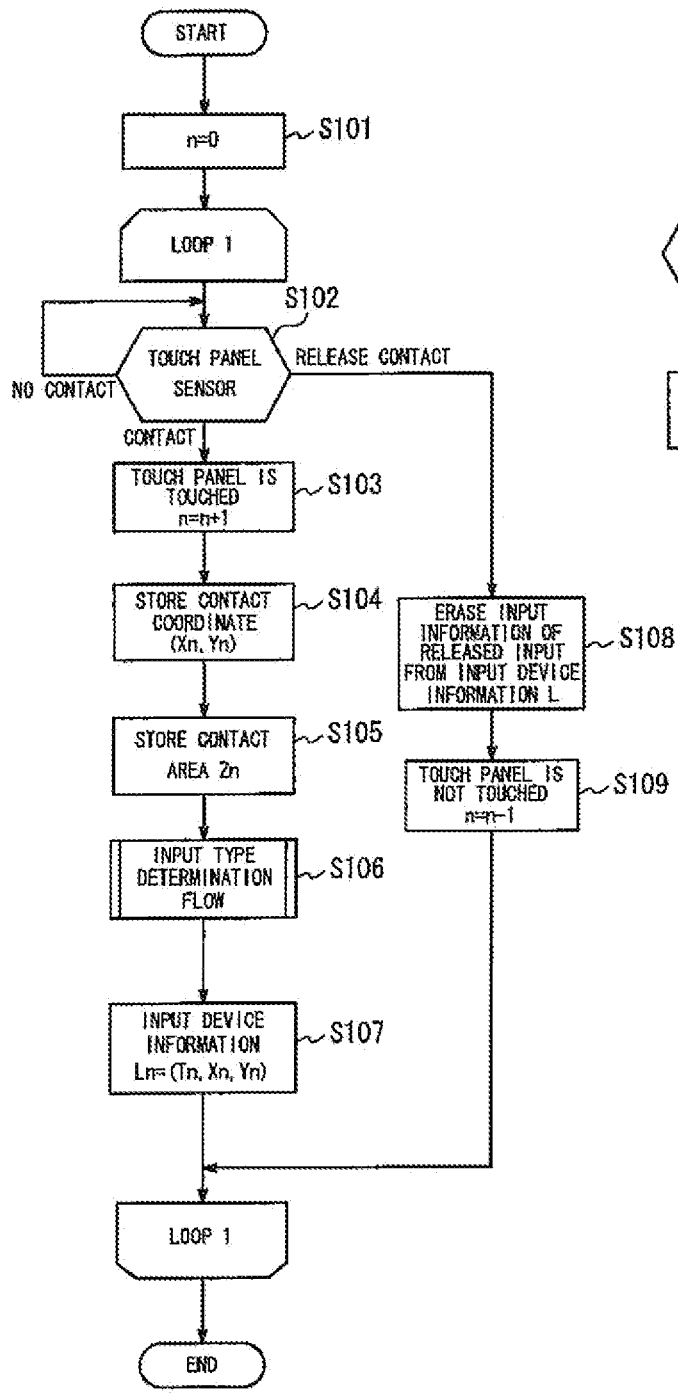
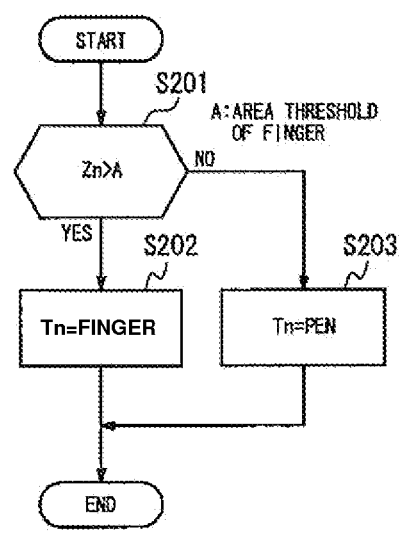

PORTABLE TERMINAL AND CONTROL METHOD THEREFOR

TECHNICAL FIELD

The present invention relates to a portable terminal for detecting an input using display unit when information is input and a control method therefor.

BACKGROUND ART

In recent years, there are an increasing number of portable terminals employing touch panels for realizing UIs (User Interfaces) that mainly use soft keys and a reduction in size of the portable terminals is in progress. In employing the touch panels in such portable terminals, a large number of methods for effectively using limited spaces of the touch panels are proposed. For example, there are proposed a method of determining an area in contact with a tablet and generating a soft keyboard when the contact area exceeds a threshold (e.g., Patent Document 1) and a method that can change, without displaying a menu on a screen, an input to a touch panel by applying mode switching operation to an electronic pen (e.g., Patent Document 2).

In order to prevent malfunction of soft keys displayed in a narrow space, there is also proposed a method of calculating a frequency of use of the soft keys by a user and increasing a size of frequently-used soft keys to thereby prevent wrong operation of the user (e.g., Patent Document 3). In order to quickly perform character input operation using as few keys as possible, for example, there are also proposed a method of displaying a soft key character string (e.g., Patent Document 4) and a method of causing a touch pen to come into contact with soft keys when characters are input and inputting a large number of characters to soft key display according to directions for moving the touch pen (e.g., Patent Document 5).

In order to improve operability for users, there are an increasing number of portable terminals in which dedicated devices are provided to allow, when applications run in the background, the users to operate the applications in the background. Such dedicated devices make it possible to save labor and time of the users to switch screens of the applications in order to operate the applications in the background.

Patent Document 1: Japanese Patent Laid-Open No. 11-272423
Patent Document 2: Japanese Patent Laid-Open No. 07-160398
Patent Document 3: Japanese Patent Laid-Open No. 11-265240
Patent Document 4: Japanese Patent Laid-Open No. 2001-84086
Patent Document 5: Japanese Patent Laid-Open No. 2003-157144

Technical Problem

However, with the method proposed in Patent Document 1, functions of objects (soft keys, etc.) correspond to inputs is a one to one relation irrespective of an input type (a pen or a finger). Since a function of an object corresponding to an input is represented irrespective of the input type, in order to realize other functions, it is necessary to generate new objects for realizing the functions. Therefore, when a space of a display unit is small, there is an inconvenience that the number of kinds of operation necessary for attaining a purpose increases.

With the method proposed in Patent Document 2, since hardware dependency is high, the method is inconvenient for a user in that a touch panel and an input device requiring special control are necessary and operation on the input device increases.

With the method proposed in Patent Document 3, since a user needs to consciously operate a less frequently used soft key when the user uses the soft key, it is difficult to say that the method is satisfactory for the user in terms of operability.

With the methods proposed in Patent Document 4 and the Patent Document 5, although the number of times of character input during mail creation decreases, except input operation, it is necessary to perform screen switching by operation of a touch panel many times as in a conventional mail application.

Further, in providing a dedicated device for operating an application in the background, there is an inconvenience that hardware increases in size and in cost and, since the device handles only a preset application, the device lacks universality.

It is an object of the present invention to provide a portable terminal and a control method therefor that can realize, in realizing a UI employing a touch panel, multi-functional operations in a limited display space using a general input device without increasing the number of kinds of operation performed until a purpose is attained.

SUMMARY

In order to attain the object, a portable terminal according to an embodiment of the present invention is characterized by including: storing unit for storing various applications; display unit for displaying a screen of each of the applications; input detecting unit for detecting each of plural inputs to the display unit; and control unit for executing, when it is detected by the input detecting unit that an input to the display unit is a first input by first input means, on the basis of the first input, a function of the application allocated in advance to an area on the screen of the application specified by the first input, and prohibiting, when it is detected by the input detecting unit that the input to the display unit is a second input by the second input means, the execution of the function of the application allocated in advance on the screen of the application and executing, on the basis of the second input, a predetermined function not allocated to the area on the screen of the application.

A portable terminal according to another embodiment of the present invention is preferably includes: storing unit for storing various applications; display unit for displaying a screen of each of the applications; a touch panel disposed on a front surface of the display unit in association with the display unit; input detecting unit for detecting an input to the touch panel; discriminating unit for discriminating whether the input detected by the input detecting unit is an input by first input means or an input by second input means; and control unit for executing, when it is discriminated that the input is a first input by the first input means, on the basis of the first input, a function of the application allocated in advance to an area on the screen of the application specified by an input coordinate of the first input means, and prohibiting, when it is discriminated that the input is a second input by the second input means, the execution of the function of the application allocated in advance on the screen of the application and executing, on the basis of the second input, a predetermined function not allocated to the area on the screen of the application.

The portable terminal according to another embodiment of the present invention preferably scrolls, when the application screen can be viewed with a scroll function, the screen of the application on the basis of the second input.

The portable terminal according to still another embodiment of the present invention preferably performs, when the application has a handwritten character input function, character input with the first input and performs character erasing and character shift with the second input.

A portable terminal according to still another embodiment of the present invention preferably includes: storing unit for storing various applications; display unit for displaying a screen of each of the applications; input detecting unit for detecting each of plural inputs to the display unit; and control unit for executing, when it is detected by the input detecting unit that an input to the display unit is a first input by first input means, on the basis of the first input, a function of the application allocated in advance to an area on the screen of the application specified by the first input, and prohibiting, when it is detected by the input detecting unit that the input to the display unit is a second input by the second input means, the execution of the function of the application allocated in advance on the screen of the application and executing, when the first input is detected during a period in which the second input continues, on the basis of the first input, a predetermined function not allocated to the area on the screen of the application.

A portable terminal according to still another embodiment of the present invention preferably includes: storing unit for storing various applications; display unit for displaying a screen of each of the applications; input detecting unit for detecting each of plural inputs to the display unit; and a control unit that, when one main application, a screen of which is displayed on the display unit, and one background application, a screen of which is not displayed on the display unit, are simultaneously activated, executes, when it is detected by the input detecting unit that an input to the display unit is a first input by first input means, on the basis of the first input, a function of the main application allocated in advance to an area on the screen of the main application specified by the first input, and prohibits, when it is detected by the input detecting unit that the input to the display unit is a second input by the second input means, the execution of the function of the main application allocated in advance on the screen of the main application and executes, on the basis of the second input, a predetermined function of the background application.

A portable terminal according to still another embodiment of the present invention is preferably includes: storing unit for storing various applications; display unit for displaying a screen of each of the applications; a touch panel disposed on a front surface of the display unit in association with the display unit; input detecting unit for detecting an input to the touch panel; discriminating unit for discriminating whether the input detected by the input detecting unit is an input by first input means or an input by second input means; and control unit for executing, when it is discriminated that the input is a first input by the first input means, on the basis of the first input, a function of the application allocated in advance to an area on the screen of the application specified by an input coordinate of the first input means, and prohibiting, when it is detected that the input is a second input by the second input means, the execution of the function of the application allocated in advance on the screen of the application and executing, when the first input by the first input means is detected during a period in which the second input by the second input means continues, on the basis of the first input, a predetermined function not allocated to the area on the screen of the application.

A portable terminal according to still another embodiment of the present invention preferably includes: storing unit for storing various applications; display unit for displaying a screen of each of the applications; a touch panel disposed on a front surface of the display unit in association with the display unit; input detecting unit for detecting an input to the touch panel; discriminating unit for discriminating whether the input detected by the input detecting unit is an input by first input means or an input by second input means; and a control unit that, when one main application, a screen of which is displayed on the display unit, and one background application, a screen of which is not displayed on the display unit, are simultaneously activated, executes, when it is discriminated that the input is a first input by first input means, on the basis of the first input, a function of the main application allocated in advance to an area on the screen of the main application specified by an input coordinate of the first input means, and prohibits, when it is discriminated that the input is a second input by the second input means, the execution of the function of the main application allocated in advance on the screen of the main application and executes, on the basis of the second input, a predetermined function of the background application.

In the portable terminal according to still another embodiment of the present invention, the input detecting unit preferably includes: imaging unit for picking up an image of the periphery of the display unit; and image analyzing unit for analyzing the image picked up by the imaging unit.

In the portable terminal according to still another embodiment of the present invention, the input detecting unit preferably includes: an image sensor incorporated in the display unit; and image analyzing unit for analyzing an image output from the image sensor.

In the portable terminal according to still another embodiment of the present invention, it is preferable that the first input is a main input, a contact area of which with the display unit or the touch panel is smaller than a predetermined value, and the second input is a sub-input, a contact area of which with the display unit or the touch panel is equal to or larger than the predetermined value.

In the portable terminal according to still another embodiment of the present invention, it is preferable that the main input is an input by a pen, and a sub-input is an input by a finger.

A control method for a portable terminal according to an embodiment of the present invention is a control method for a portable terminal including: storing unit for storing various applications; display unit for displaying a screen of each of the applications; and input detecting unit for detecting each of plural inputs to the display unit; the control method characterized by including: executing, when it is detected by the input detecting unit that an input to the display unit is a first input by first input means, on the basis of the first input, a function of the application allocated in advance to an area on the screen of the application specified by the first input; and prohibiting, when it is detected by the input detecting unit that the input to the display unit is a second input by the second input means, the execution of the function of the application allocated in advance on the screen of the application and executing, on the basis of the second input, a predetermined function not allocated to the area on the screen of the application.

A control method for a portable terminal according to another embodiment of the present invention is a control method for a portable terminal including: storing unit for storing various applications; display unit for displaying a screen of each of the applications; a touch panel disposed on a front surface of the display unit in association with the display unit; and input detecting unit for detecting an input to the touch panel, the control method preferably including: discriminating whether the input detected by the input detecting unit is an input by first input means or an input by second input means; executing, when it is discriminated that the input is a first input by the first input means, on the basis of the first input, a function of the application allocated in advance to an area on the screen of the application specified by an input coordinate of the first input means; and prohibiting, when it is detected that the input is a second input by the second input means, the execution of the function of the application allocated in advance on the screen of the application and executing, on the basis of the second input, a predetermined function not allocated to the area on the screen of the application.

The control method for portable terminal according to another embodiment of the present invention preferably includes scrolling, when the application screen can be viewed with a scroll function, the screen of the application on the basis of the second input.

The control method for a portable terminal according to still another embodiment of the present invention preferably includes performing, when the application has a handwritten character input function, character input with the first input and performing character erasing and character shift with the second input.

A control method for a portable terminal according to still another embodiment of the present invention is a control method for a portable terminal including: storing unit for storing various applications; display unit for displaying a screen of each of the applications; and input detecting unit for detecting each of plural inputs to the display unit, the control method preferably including: executing, when it is detected by the input detecting unit that an input to the display unit is a first input by first input means, on the basis of the first input, a function of the application allocated in advance to an area on the screen of the application specified by the first input; and prohibiting, when it is detected by the input detecting unit that the input to the display unit is a second input by the second input means, the execution of the function of the application allocated in advance on the screen of the application and executing, when the first input is detected during a period in which the second input continues, on the basis of the first input, a predetermined function not allocated to the area on the screen of the application.

A control method for a portable terminal according to still another embodiment of the present invention is a control method for a portable terminal including: storing unit for storing various applications; display unit for displaying a screen of each of the applications; and input detecting unit for detecting each of plural inputs to the display unit, the control method preferably including: when one main application, a screen of which is displayed on the display unit, and one background application, a screen of which is not displayed on the display unit, are simultaneously activated, executing, when it is detected by the input detecting unit that an input to the display unit is a first input by first input means, on the basis of the first input, a function of the main application allocated in advance to an area on the screen of the main application specified by the first input; and prohibiting, when it is detected by the input detecting unit that the input to the display unit is a second input by the second input means, the execution of the function of the main application allocated in advance on the screen of the main application and executing, on the basis of the second input, a predetermined function of the background application.

A control method for a portable terminal according to still another embodiment of the present invention is a control method for a portable terminal including: storing unit for storing various applications; display unit for displaying a screen of each of the applications; a touch panel disposed on a front surface of the display unit in association with the display unit; and input detecting unit for detecting an input to the touch panel, the control method preferably including: discriminating whether the input detected by the input detecting unit is an input by first input means or an input by second input means; executing, when it is discriminated that the input is a first input by the first input means, on the basis of the first input, a function of the application allocated in advance to an area on the screen of the application specified by an input coordinate of the first input means; and prohibiting, when it is detected that the input is a second input by the second input means, the execution of the function of the application allocated in advance on the screen of the application and executing, when the first input by the first input means is detected during a period in which the second input by the second input means continues, on the basis of the first input, a predetermined function not allocated to the area on the screen of the application.

A control method for a portable terminal according to still another embodiment of the present invention is a control method for a portable terminal including: storing unit for storing various applications; display unit for displaying a screen of each of the applications; a touch panel disposed on a front surface of the display unit in association with the display unit; and input detecting unit for detecting an input to the touch panel, the control method preferably including: discriminating whether the input detected by the input detecting unit is an input by first input means or an input by second input means; when one main application, a screen of which is displayed on the display unit, and one background application, a screen of which is not displayed on the display unit, are simultaneously activated, executing, when it is discriminated that the input is a first input by first input means, on the basis of the first input, a function of the main application allocated in advance to an area on the screen of the main application specified by an input coordinate of the first input means; and prohibiting, when it is discriminated that the input is a second input by the second input means, the execution of the function of the main application allocated in advance on the screen of the main application and executing, on the basis of the second input, a predetermined function of the background application.

In the control method for a portable terminal according to still another embodiment of the present invention, the input detecting unit preferably includes: imaging unit for picking up an image of the periphery of the display unit; and image analyzing unit for analyzing the image picked up by the imaging unit.

In the control method for a portable terminal according to still another embodiment of the present invention, the input detecting unit preferably includes: an image sensor incorporated in the display unit; and image analyzing unit for analyzing an image output from the image sensor.

In the control method for a portable terminal according to still another embodiment of the present invention, it is preferable that the first input is a main input, a contact area of which with the display unit or the touch panel is smaller than a predetermined value, and the second input is a sub-input, a contact area of which with the display unit or the touch panel is equal to or larger than the predetermined value.

In a control method for a portable terminal according to still another embodiment of the present invention, it is preferable that the main input is an input by a pen, and a sub-input is an input by a finger.

A portable terminal according to still another embodiment of the present invention includes: display unit for displaying a screen of a mail application; a touch panel disposed on a front surface of the display unit in association with the display unit; and input detecting unit for detecting an input to the touch panel, the portable terminal preferably including: discriminating unit for discriminating whether the input detected by the input detecting unit is an input by first input means or an input by second input means; and control unit for executing, on a mail creation screen of the mail application, when it is discriminated that the input is a first input by the first input means, on the basis of the first input, a function allocated in advance to an area on the mail creation screen specified by an input coordinate of the first input means, performing, when it is discriminated that the input is a second input by the second input means and an input start position and an input release position of the second input detected by the input detecting unit are substantially the same, switching control for the mail creation screen and a viewing screen for a mail as a source of invocation of the mail creation screen, and controlling, when it is discriminated that the input is the second input by the second input means and the input start position and the input release position of the second input detected by the input detecting unit are different, the mail application screen to scroll.

A portable terminal according to still another embodiment of the present invention is a portable terminal including: display unit for displaying a screen of a mail application; a touch panel disposed on a front surface of the display unit in association with the display unit; and input detecting unit for detecting an input to the touch panel, the portable terminal preferably including: discriminating unit for discriminating whether the input detected by the input detecting unit is an input by first input means or an input by second input means; and control unit for performing control, on the screen of the mail application, when it is discriminated that the input is a second input by the second input means and a first input by the first input means is detected in relation to an area indicating an attachment file on the screen of the mail application during a period in which the second input is continuously detected by the input detecting unit, to reproduce the attachment file.

A portable terminal according to still another embodiment of the present invention is a portable terminal including: display unit for displaying a screen of a mail application; a touch panel disposed on a front surface of the display unit in association with the display unit; and input detecting unit for detecting an input to the touch panel, the portable terminal preferably including: discriminating unit for discriminating whether the input detected by the input detecting unit is an input by first input means or an input by second input means; and control unit for performing control, on the screen of the mail application, when it is discriminated that the input is a second input by the second input means and a first input by the first input means is detected during a period in which the second input is continuously detected by the input detecting unit, to copy data displayed on the screen of the mail application in a range with an input start position of the first input set as a start point and an input release position of the first input set as an end point.

In the portable terminal according to still another embodiment of the present invention, the control unit preferably further pastes, when the first input is detected in a data pastable area on the screen of the mail application for the first time after input release of the second input is detected by the detecting unit, the copied data with an input position of the first input set as a starting point.

In the portable terminal according to still another embodiment of the present invention, it is preferable that the first input is a main input, a contact area of which with the touch panel is smaller than a predetermined value, and the second input is a sub-input, a contact area of which with the touch panel is equal to or larger than the predetermined value.

In the portable terminal according to still another embodiment of the present invention, it is preferable that the main input is an input to the touch panel by a pen, and a sub-input is an input to the touch panel by a finger.

A control method for a portable terminal according to still another embodiment of the present invention is a control method for a portable terminal including: display unit for displaying a screen of a mail application; a touch panel disposed on a front surface of the display unit in association with the display unit; and input detecting unit for detecting an input to the touch panel, the control method preferably further including control unit for: discriminating whether the input detected by the input detecting unit is an input by first input means or an input by second input means; executing, on a mail creation screen of the mail application, when it is discriminated that the input is a first input by the first input means, on the basis of the first input, a function allocated in advance to an area on the mail creation screen specified by an input coordinate of the first input means; performing, when it is discriminated that the input is a second input by the second input means and an input start position and an input release position of the second input detected by the input detecting unit are substantially the same, switching control for the mail creation screen and a viewing screen for a mail as a source of invocation of the mail creation screen; and controlling, when it is discriminated that the input is the second input by the second input means and the input start position and the input release position of the second input detected by the input detecting unit are different, the mail application screen to scroll.

A control method for a portable terminal according to still another embodiment of the present invention is a control method for a portable terminal including: display unit for displaying a screen of a mail application; a touch panel disposed on a front surface of the display unit in association with the display unit; and input detecting unit for detecting an input to the touch panel, the control method preferably including: discriminating whether the input detected by the input detecting unit is an input by first input means or an input by second input means; and performing control, on the screen of the mail application, when it is discriminated that the input is a second input by the second input means and a first input by the first input means is detected in relation to an area indicating an attachment file on the screen of the mail application during a period in which the second input is continuously detected by the input detecting unit, to reproduce the attachment file.

A control method for a portable terminal according to still another embodiment of the present invention is a control method for a portable terminal including: display unit for displaying a screen of a mail application; a touch panel disposed on a front surface of the display unit in association with the display unit; and input detecting unit for detecting an input to the touch panel, the control terminal preferably including: discriminating whether the input detected by the input detecting unit is an input by first input means or an input by second input means; and performing control, on the screen of the mail application, when it is discriminated that the input is a second input by the second input means and a first input by the first input means is detected during a period in which the second input is continuously detected by the input detecting unit, to copy data displayed on the screen of the mail application in a range with an input start position of the first input set as a start point and an input release position of the first input set as an end point.

The control method for a portable terminal according to still another embodiment of the present invention preferably pasting, when the first input is detected in a data pastable area on the screen of the mail application for the first time after input release of the second input is detected by the detecting unit, the copied data with an input position of the first input set as a starting point.

In the control method for a portable terminal according to still another embodiment of the present invention, it is preferable that the first input is a main input, a contact area of which with the touch panel is smaller than a predetermined value, and the second input is a sub-input, a contact area of which with the touch panel is equal to or larger than the predetermined value.

In the control method for a portable terminal according to still another embodiment of the present invention, it is preferable that the main input is an input to the touch panel by a pen, and a sub-input is an input to the touch panel by a finger.

Advantageous Effects on Invention

According to the present invention, it is discriminated whether an input to the display unit is an input by the first input means or an input by the second input means and functions other than an object displayed are realized according to the input means. Therefore, in realizing a UI employing the display unit, it is possible to realize multifunctional operations in a limited display space using a general input device without increasing the number of kinds of operation performed until a purpose is attained.

BRIEF DESCRIPTION OF DRAWINGS

FIG. 3A is a flowchart for determining input means and FIG. 3B is a flowchart for determining an input type;

Figure 1:
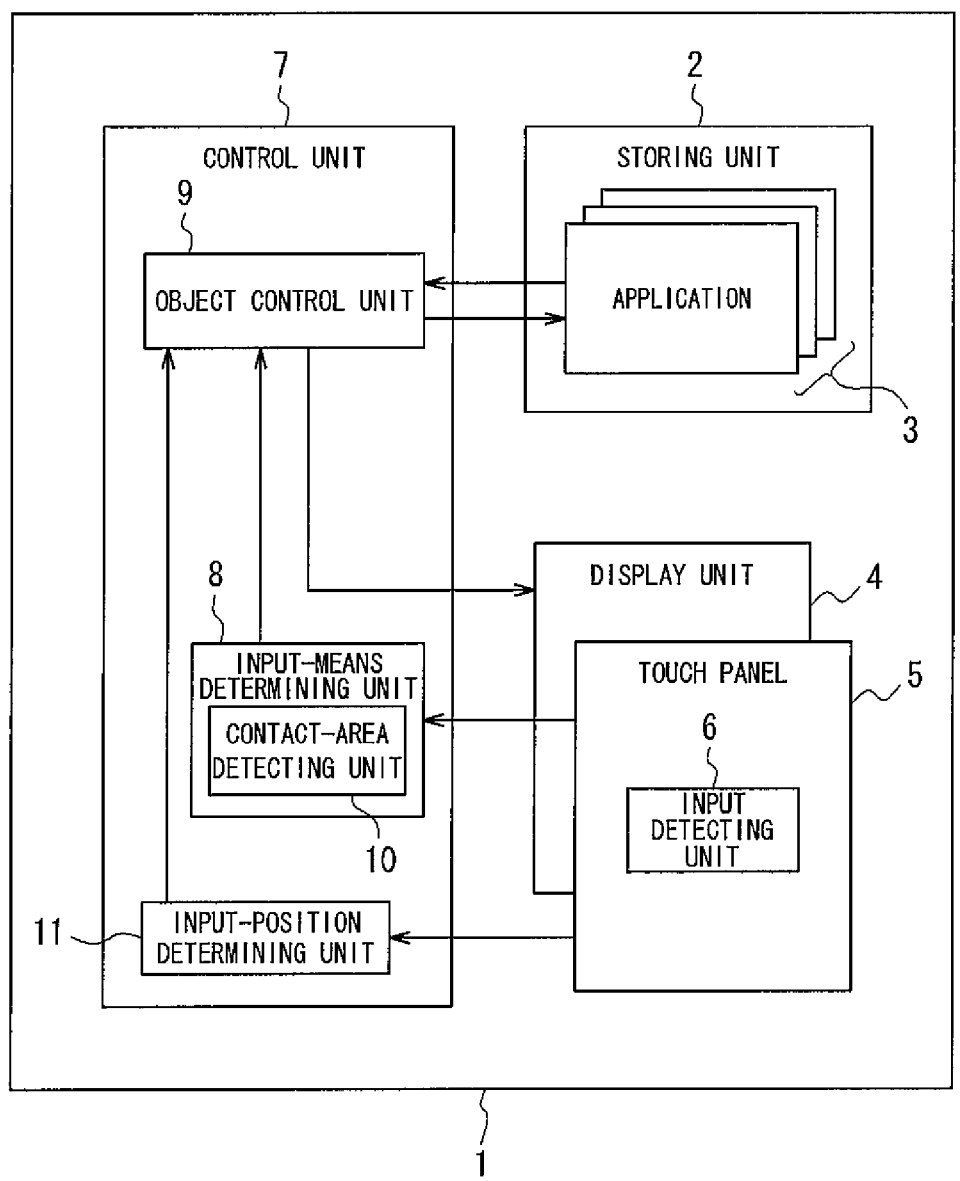
FIG. 1 is a block diagram of a portable terminal according to a first embodiment of the present invention.

REFERENCE SIGNS LIST 1, 20 portable terminals
2 storing unit 3 application
4 display unit
5, 21 touch panels
6 input detecting unit
7, 25 control unit
8 input-means determining unit
9 object control unit
10 contact-area detecting unit
11 input-position determining unit
22 contact detecting unit
23 characteristic determining unit
24 input-means determining unit
26 input device
27 camera

DESCRIPTION OF EMBODIMENTS

A portable terminal and a control method therefor according to the present invention are explained in detail with reference to the drawings.

First Embodiment

FIG. 1 is a block diagram of a portable terminal according to a first embodiment of the present invention. A portable terminal 1 shown in FIG. 1 is a portable communication terminal such as a PDA (personal digital assistance). A storing unit 2 stores various applications 3 and a display unit 4 displays various objects (e.g., soft keys) and the like that form screens of the applications 3. A touch panel 5 is disposed on a front surface of the display unit 4 in association with the display unit 4. Inputs to the objects are detected by an input detecting unit 6.

A control unit 7 includes an input-means determining unit 8, an object control unit 9, and an input-position determining unit 11 and controls operations of the applications 3 on the basis of inputs from the touch panel 5. The input-means determining unit 8 includes a contact-area detecting unit 10 and calculates, when an input to the touch panel 5 is detected by the input detecting unit 6, a contact area of the input and discriminates input means. For example, the input-means determining unit 8 discriminates that the input is a pen input when the area calculated by the contact-area calculating unit 10 is smaller than a predetermined value and discriminates that the input is an input by a finger when the area calculated by the contact-area calculating unit 10 is equal to or larger than the predetermined value. The input-position determining unit 11 determines, when an input to the touch panel 5 is detected by the input detecting unit 6, an input coordinate of the input.

The object control unit 9 executes, according to the input means discriminated by the input-means determining unit 8 and the input coordinate determined by the input-position determining unit 11, a function of an object corresponding thereto. For example, when an input to the touch panel 5 is detected and it is determined by the input-means determining unit 8 that the input is a pen input, the object control unit 9 executes a function of an object displayed in a position on the display unit 4 corresponding to an input coordinate of the pen input determined by the input-position determining unit 11. When it is determined by the input-means determining unit 8 that the input is an input by a finger, the object control unit 9 prohibits functions of all objects displayed on the display unit 4 and executes a function allocated to the input by the finger.

Figure 2:
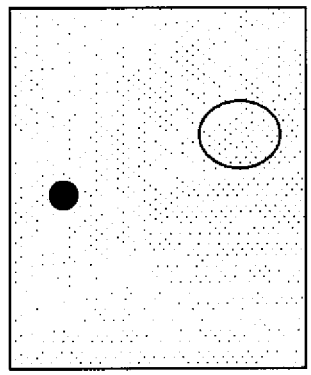
FIG. 2 is a diagram for explaining an input-means determining method in a case in which a panel of a surface elastic type is used as a touch panel.

FIG. 2 is a diagram for explaining an input-means determining method in a case in which a panel of a surface elastic type is used as a touch panel. It is determined whether an input is a pen input (a main input) or an input by a finger (a sub-input). In the touch panel of the surface elastic type, it is possible to detect an input position by measuring time from the application of vibration until the reflected vibration comes back. A change occurs in a signal value by an amount of absorption of surface acoustic waves due to the input. It is possible to calculate a contact area by integrating time in which the change occurs. The input-means determining unit 8 discriminates, when a contact area on the touch panel 5 is smaller than a predetermined value, that the input is the main input, i.e., the input by a pen and discriminates, when a contact area on the touch panel 5 is equal to or larger than the predetermined value, that the input is the sub-input, i.e., the input by a finger. When inputs are simultaneously performed in plural places on the touch panel, the input-means determining unit 8 calculates contact areas for the respective inputs and specifies input means.

FIG. 3A is a flowchart for determining an input state. FIG. 3B is a flowchart for determining input means. In FIG. 3A, when the portable terminal 1 is activated by power supply or the like, the portable terminal 1 initializes a counter "n" for counting input detection places on the touch panel 5 (n=0) (step S101) and comes into a state of waiting for an input to the touch panel 5 ("no contact" in step S102).

When the portable terminal 1 detects an input to the touch panel 5 anew, i.e., when a pen or a finger touches the touch panel 5 ("contact" in step S102), the portable terminal 1 increments the counter "n" for counting the number of input detection places on the touch panel 5 (n=n+1) (step S103), detects an input coordinate (Xn, Yn) (step S104), and calculates a contact area Z on the touch panel 5 due to the input (step S105). Subsequently, the input-means determining unit 8 discriminates, on the basis of the contact area Zn calculated in step S105, input means indicating, for example, whether the input is an input by a pen or an input by a finger (step S106). A method of discriminating input means in step S106 is shown in FIG. 3B. The control unit 7 determines, on the basis of the determined input coordinate (Xn, Yn) and input means (Tn), input device information Ln (Ln=(Tn,Xn,Yn)) indicating an input state of the input (step S107).

In FIG. 3B, the input-means determining unit 8 determines whether the contact area Zn is larger than an area threshold A of a finger (step S201). When the contact area Zn is equal to or larger than the area threshold A (Yes in step S201), the input-means determining unit 8 determines that an input type is a finger (Tn=FINGER) (step S202). When the contact area Zn is smaller than the area threshold A (No in step S201), the input-means determining unit 8 determines that the input type is a pen (Tn=PEN) (step S203).

On the other hand, when the input to the touch panel 5 is released, i.e., when the pen or the finger is released from the touch panel ("contact release" in step S102), the control unit 7 erases the input device information Ln stored in association with the released input (step S108). Since the input detection places decreases by one, the control unit 7 decrements the counter "n" (step S109).

According to the processing explained above, when it is discriminated that the input is the main input by a pen, the object control unit 9 executes, on the basis of the main input, a function (an object) of an application allocated in advance to an area on the screen of the application specified by an input coordinate of the main input. When it is discriminated that the input is the sub-input by a finger, the object control unit 9 prohibits execution of the function (the object) of the application allocated in advance on the screen of the application and executes, on the basis of the sub-input, a predetermined function not allocated to the area on the screen of the application. When the sub-input by a finger and the main input by a pen are simultaneously detected, the object control unit 9 prohibits execution of the function allocated in advance on the application screen and executes the predetermined function not allocated to the application screen.

Figure 4:
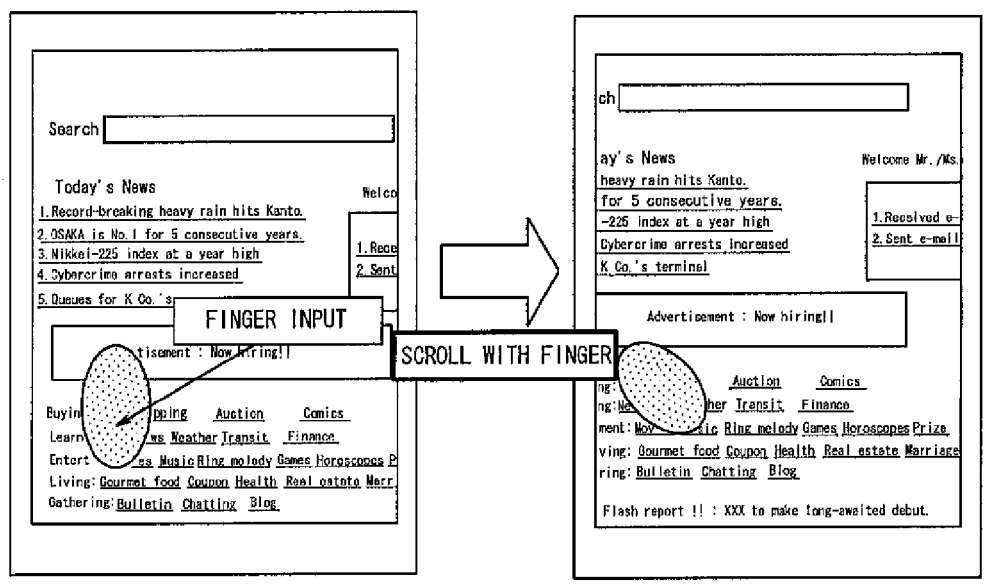
FIG. 4 is a diagram for explaining a case in which the present invention is applied to a WEB browser.
Figure 5:
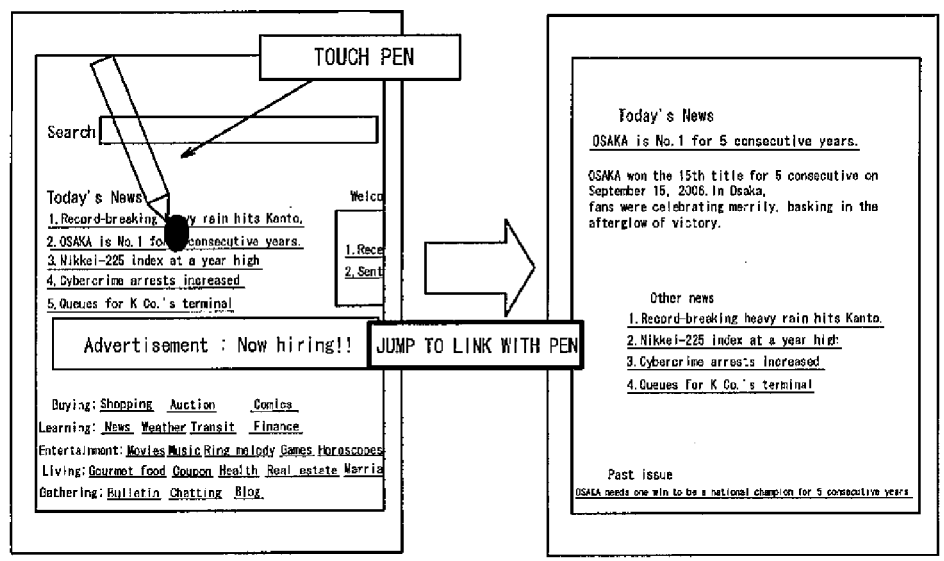
FIG. 5 is a diagram for explaining a case in which the present invention is applied to the WEB browser.
Figure 6:
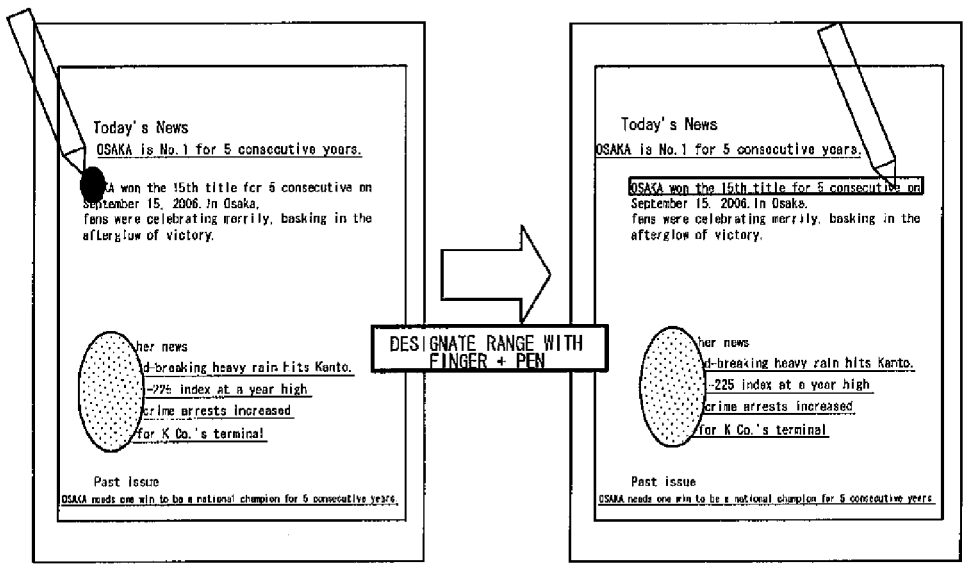
FIG. 6 is a diagram for explaining a case in which the present invention is applied to the WEB browser.

FIGS. 4 to 6 are diagrams for explaining an example in a case in which the present invention is applied to a WEB browser. In this embodiment, in such a WEB browser, a scroll function is allocated to the sub-input and a range designation function is allocated to the main input in the sub-input.

As shown in FIG. 4, when a user touches a WEB browser screen with a finger, according to a contact area on the touch panel 5, it is determined by the input-means determining unit 8 that an input is an input by the finger as the sub-input. The scroll function allocated to the sub-input works. In this case, since the input is the sub-input by a finger, a function allocated to the WEB screen in advance is not executed (is prohibited). Therefore, for example, even if the finger touches link information, the WEB screen does not jump to a link destination of the WEB. In other words, the user can scroll the WEB screen by tracing the screen with the finger without anticipating that the finger touches functions such as a link. When a screen of an application can be viewed by the scroll function in this way, the functions such as a link displayed on the application screen is invalidated on the basis of an input to the touch panel 5 by the finger and the screen of the application is scrolled on the basis of an input track of the finger.

When the WEB browser is touched by the pen as the main input as shown in FIG. 5, a link displayed in a contact position functions and the WEB screen jumps to a link destination of the WEB. When an input by the pen is performed in a state in which the WEB browser is touched by the finger as shown in FIG. 6, the WEB screen changes to a range designation mode. In other words, according to the touch of the finger, the functions displayed on the application screen are invalidated and, for example, the WEB screen does not jump to a link destination even if the pen touches a link. A function allocated to the pen input in the state in which the finger touches the WEB browser, i.e., in this embodiment, a function such as copying on the WEB screen by range designation works.

Figure 7:
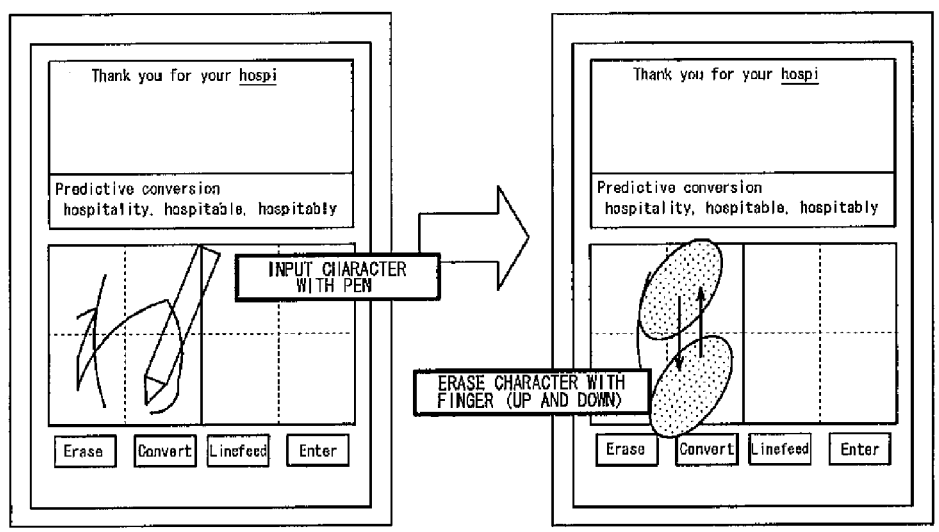
FIG. 7 is a diagram for explaining a case in which the present invention is applied to a manual character input application.
Figure 8:
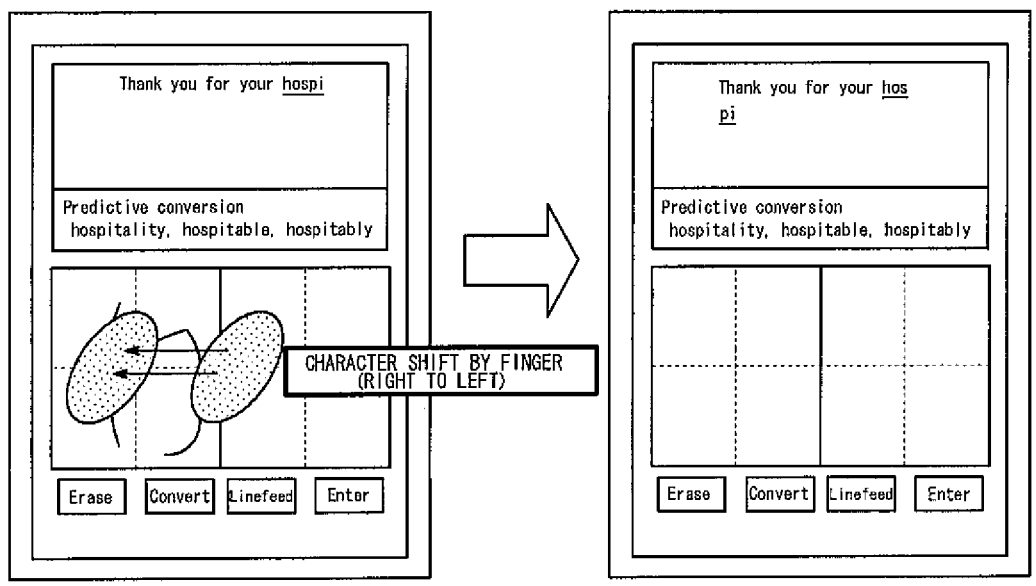
FIG. 8 is a diagram for explaining a case in which the present invention is applied to the manual character input application.

FIGS. 7 and 8 are diagrams for explaining a case in which the present invention is applied to a manual character input application. In a case of such a manual character application, operations based on the sub-input by a finger are character erasing and character shift.

The character erasing is performed by moving the finger up and down after inputting a character to the touch panel 5 with the pen as shown in FIG. 7. In this case, the character erasing may be performed according to the sub-input irrespective of a position of the displayed character or the character may be erased according to a position of the sub-input. A character shift operation is performed when the user touches the touch panel 5 with the finger from the right to left on the screen after inputting a character to the touch panel 5 with the pen as shown in FIG. 8.

When the application has a handwritten character input function in this way, the character input is performed by the main input to the touch panel 3 by the pen and the character erasing or the character shift is performed by the sub-input to the touch panel 3 by the finger.

Figure 9:
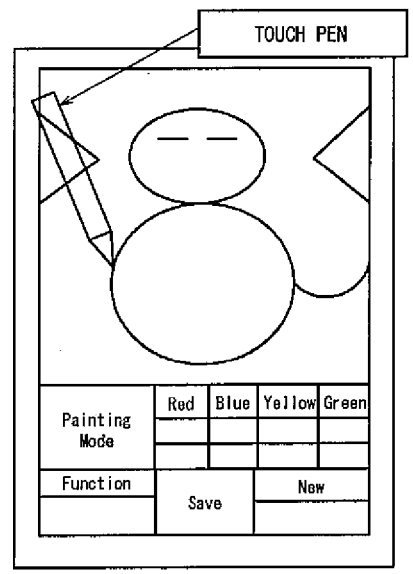
FIG. 9 is a diagram for explaining a case in which the present invention is applied to a paint tool.
Figure 10:
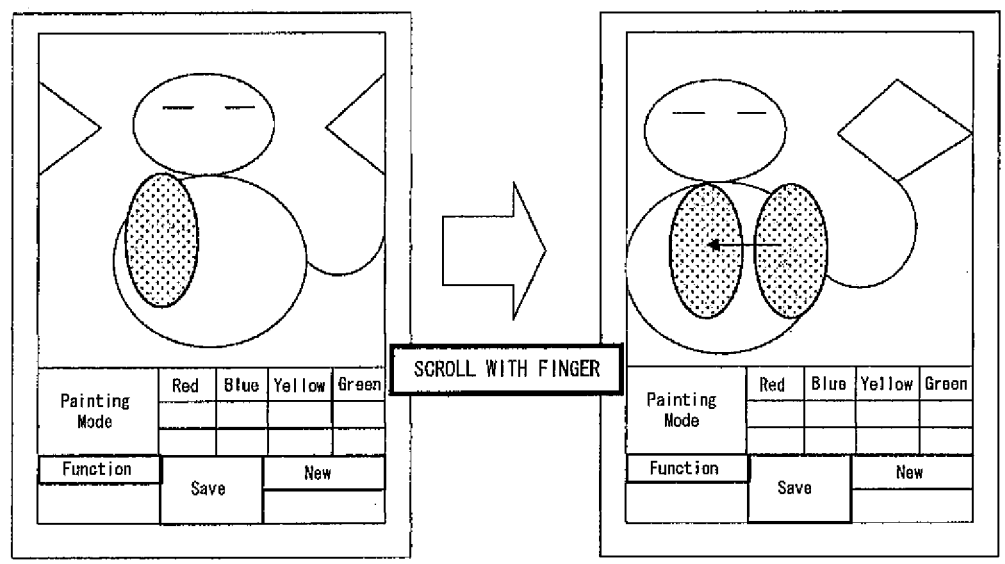
FIG. 10 is a diagram for explaining a case in which the present invention is applied to the paint tool.
Figure 11:
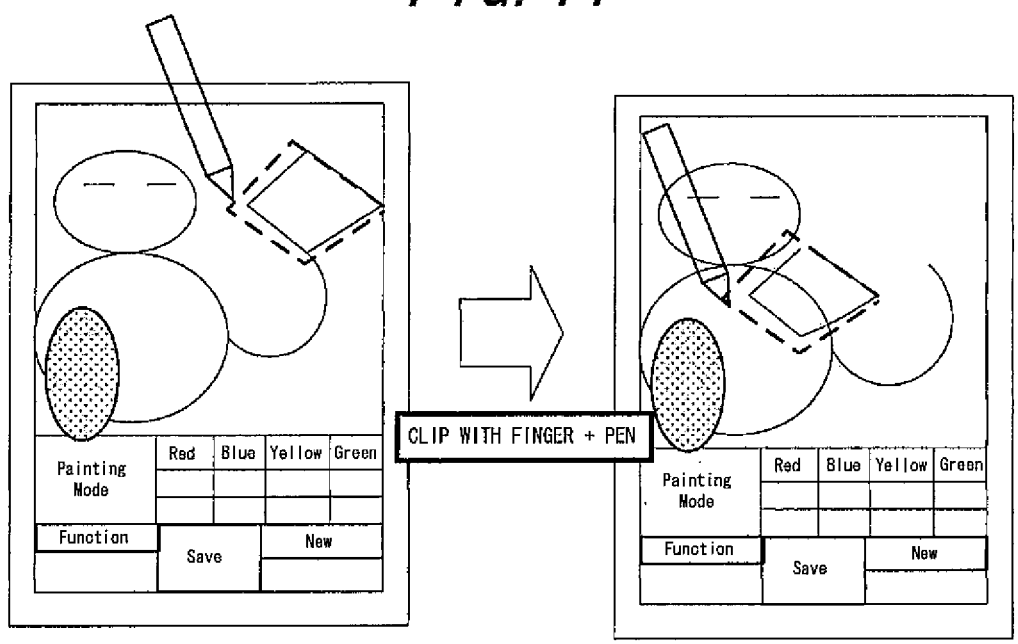
FIG. 11 is a diagram for explaining a case in which the present invention is applied to the paint tool.

FIGS. 9 to 11 are diagrams for explaining a case in which the present invention is applied to a paint tool. In a case of the paint tool shown in FIG. 9, an operation based on the sub-input by a finger is scroll of a screen. When the pen input as the main input and the input by a finger as the sub-input are simultaneously detected, range designation and clipping operations for an image sub-object as at least one of an image object are performed by encircling the image object with the pen.

As shown in FIG. 10, while executing image editing based on the pen input in a rendering area, when the portable terminal 1 detects an input by a finger on an application screen, the portable terminal 1 invalidates an image editing function allocated on the application screen and executes scroll of the application screen on the basis of an input track of the finger. As shown in FIG. 11, while the finger as the sub-input touches the touch panel 5, the portable terminal 1 range-designates a portion desired to be clipped by the pen as the main input and performs the clipping operation.

When it is discriminated that an input is the sub-input by a finger, the portable terminal 1 prohibits execution of a function of the application allocated in advance on the screen of the application. When the main input by a pen is detected in a period in which the sub-input by a finger continues, the portable terminal 1 executes, on the basis of the input by a pen as the main input, a predetermined function (e.g., an area setting and clipping function) not allocated to an area on the screen of the application.

In this embodiment, according to the touch of the finger on the application screen, the image editing function on the screen is invalidated. Even if the pen touches a rendering area, rendering is not executed. An area on an image is determined by the pen input in a state in which the finger touches the screen and an image in that area is clipped.

Figure 12:
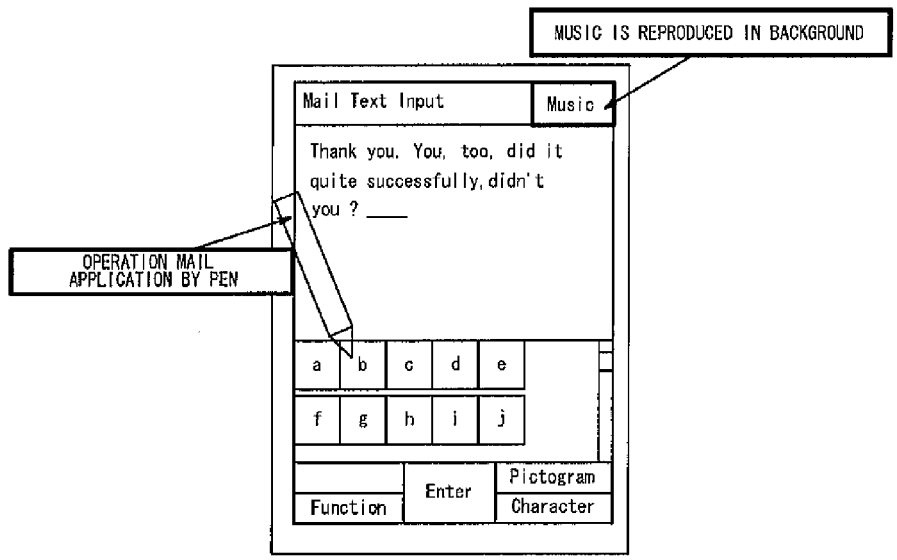
FIG. 12 is a diagram for explaining a case in which the present invention is applied when a mail application runs in the foreground and a music application runs in the background.
Figure 13:
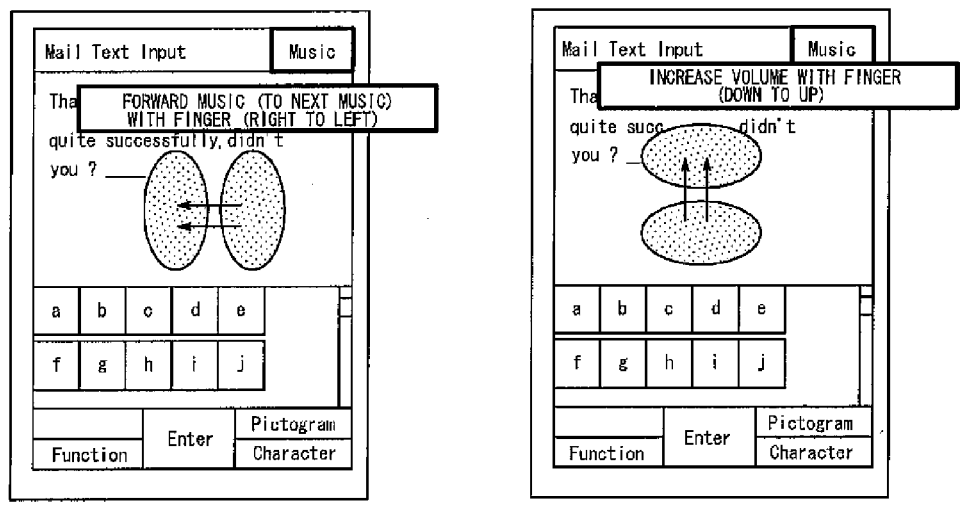
FIG. 13 is a diagram for explaining a case in which the present invention is applied when the mail application runs in the foreground and the music application runs in the background.

FIGS. 12 and 13 are diagrams for explaining an example in which the present invention is applied when a mail application runs in the foreground and a music application runs in the background. In this case, a sub-operation by a finger on a mail application screen is simple operation such as volume adjustment or music forward and reverse of the music application.

In a state in which editing of a mail is performed by the pen on the mail application screen while music is played in the background as shown in FIG. 12, a music forward operation of the music application activated in the background is performed by moving the finger from the right to left and sound volume is increased by moving the finger from down to up as shown in FIG. 13.

When one main application (mail application) in which a screen of the application 3 is displayed on the display unit 4 and at least one background application (music application) in which the screen of the application 3 is not displayed on the display unit 4 are simultaneously activated, a function of the main application allocated in advance to an area on a main application screen is executed on the basis of the main input by a pen. The execution of the function of the main application allocated in advance on the screen of the main application is prohibited and a predetermined function of the background application is executed on the basis of the sub-input by a finger.

According to embodiments explained above, functions other than a function of a displayed object (application) can be used on the touch panel. Therefore, since it is unnecessary to provide display switching and a display area for soft keys necessary for attaining an object, it is possible to effectively use a narrow space and the number of kinds of operation by the user is reduced.

Further, the input means (the pen or the finger) for input to the touch panel is determined and functions to be executed are distinguished according to the main input, the sub-input, and a combination of these inputs. Therefore, since special hardware is unnecessary and a switching operation and the like for the input device are not performed, the user can perform intuitive operation with less wrong operation in a limited space.

Further, when an application is running in the background, an application in the background can be operated on an application screen running in the foreground. Therefore, it is unnecessary to bring the application in the background to the foreground every time the application in the background is operated.

Second Embodiment

Figure 14:
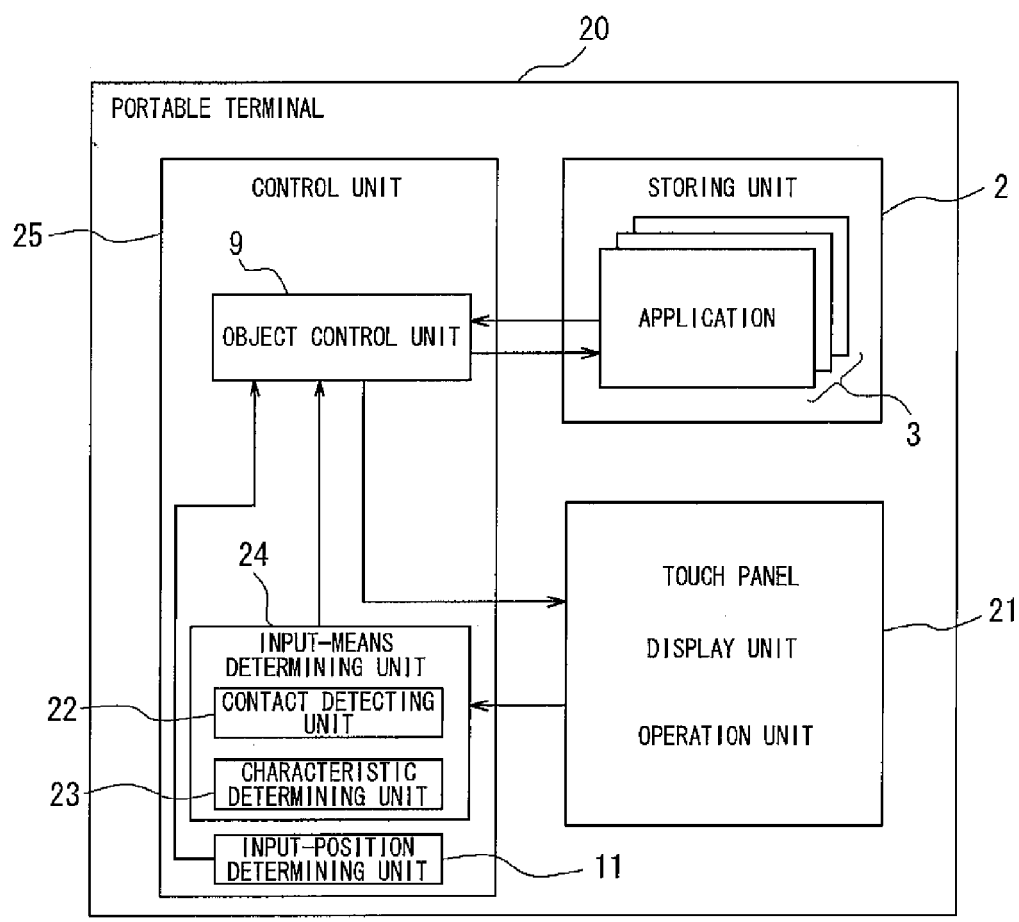
FIG. 14 is a block diagram showing a configuration of a portable terminal according to a second embodiment of the present invention.

FIG. 14 is a block diagram showing a configuration of a portable terminal according to a second embodiment of the present invention. As shown in FIG. 14, a portable terminal 20 is, for example, a potable communication terminal apparatus such as a PDA (personal digital assistance). The portable terminal 20 has components and actions same as those of the portable terminal 1 (see FIG. 1) according to the first embodiment except that the portable terminal 20 includes, instead of the display unit 4 and the touch panel 5, a touch panel 21 serving as both a display unit and an operation unit and includes a control unit 25 that includes, instead of the contact-surface detecting unit 10, an input-means determining unit 24 including a contact detecting unit 22 and a characteristic determining unit 23.

In the portable terminal 20, the touch panel 21 functions as a display unit that displays soft keys (objects) and, at the same time, functions as an operation unit that detects an input to the objects. The control unit 25 performs an operation associated with the touch panel according to an application program stored in the storing unit 2 and includes the input-means determining unit 24 and the object control unit 9.

The contact detecting unit 22 detects (monitors) contact with the touch panel 21. The characteristic determining unit 23 determines a characteristic of a state of contact with the touch panel 21 from a detection result. The input-means determining unit 24 determines, on the basis of a result of this determination, what is a type of input means, for example, a pen or a finger. In other words, the input-means determining unit 24 determines a type of the input means from the contact state.

The object control unit 9 executes, on the basis of the type of the input means determined by the input-means determining unit 24 and an input position determined by the input-position determining unit 11, a function of an object according to an application program stored in the storing unit 6. The storing unit 6 stores the application program 3. The object control unit 5 variously controls operations of an application according to the main input means and the sub-input means and sometimes controls operations of an application in the background.

The control unit 25 of the portable terminal 20 includes the input-means determining unit 24 including the contact detecting unit 22 and the characteristic determining unit 23. An application for changing operations according to input means is stored in the storing unit 6.

The portable terminal 20 performs, using an image sensor, determination of input means for applying input operation to the touch panel 21.

Figure 15:
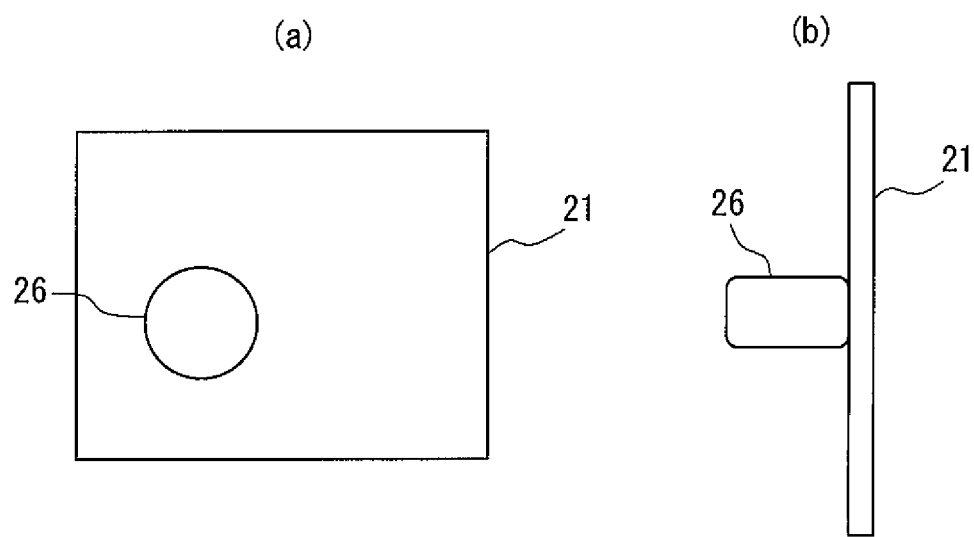
FIG. 15 conceptually shows a determination method in a case in which determination of input means is performed by using an image sensor, wherein (a) is a plan explanatory view and (b) is a side explanatory view.

FIG. 15 conceptually shows a determination method in a case in which determination of input means is performed by using the image sensor, wherein (a) is a plan explanatory view and (b) is a side explanatory view. For simplification of explanation, it is determined whether input means is a finger or a pen.

As shown in FIG. 15, an image sensor panel, which is used as the touch panel 21, integrally configured by adding a function of the image sensor to a liquid crystal display can reproduce, when an input device (input means) 26 as a finger or a pen touches the surface thereof (see (a) and (b)), a target image by converting an amount of light received in each of pixels into charges and reading the pixels in an entire area.

Therefore, the control unit 25 can determine, on the basis of a characteristic part of the input device 26 detected by the image sensor panel, whether the input device 26 is a finger or a pen. When the image sensor panel is used, it is possible to simultaneously determine plural inputs.

The determination of input means for applying input operation to the touch panel 21 may be performed by using a camera instead of the image sensor. When the determination of input means is performed by using the camera as imaging unit, plural (in this example, two) cameras 27 are set in the portable terminal 20 together with the liquid crystal display. The input-means determining unit 24 includes image analyzing unit having an image analyzing function instead of the contact detecting unit 22 and the characteristic determining unit 23.

Figure 16:
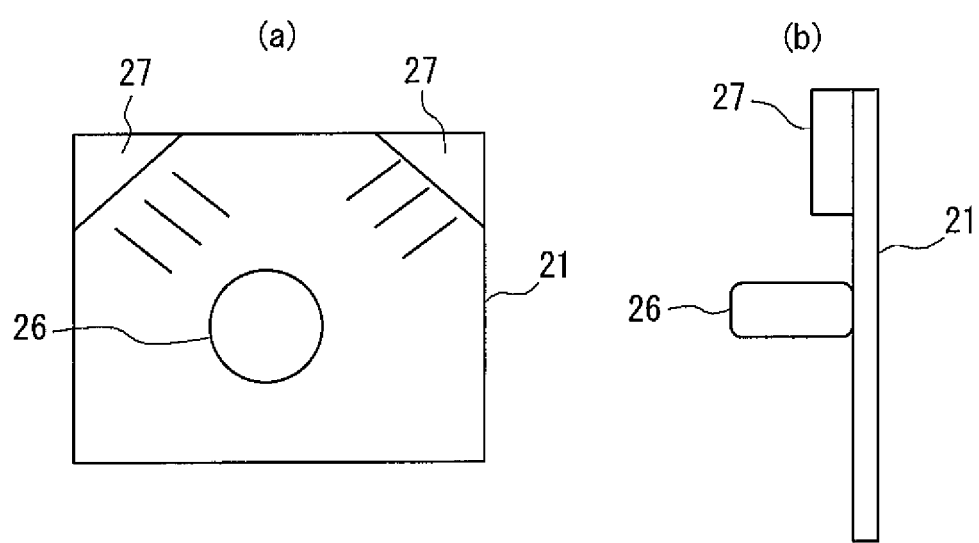
FIG. 16 conceptually shows a determination method in a case in which determination of input information is performed by using a camera, wherein (a) is a plan explanatory view and (b) is a side explanatory view.

FIG. 16 conceptually shows a determination method in a case in which determination of input information is performed by using a camera, wherein (a) is a plan explanatory view and (b) is a side explanatory view. A special detecting apparatus is not mounted on the touch panel 21 itself (i.e., the touch panel 21 only has to be a simple display). Two cameras 27 are set on a peripheral edge side of the touch panel 21, where photographing of an entire area of the surface of the touch panel 21 is possible, such that the input device 26 that touches the touch panel 21 can be photographed in any place of the touch panel 21. The portable terminal 20 detects, using the two cameras 27, a target, i.e., the input device 26 that touches the touch panel 21.

As shown in FIG. 16, first, when the input device (the input means) 26 as the finger or the pen approaches the touch panel 21, the two cameras 27 pick up images in a contact position or near the contact position of the input device 26 that touches the surface of the touch panel 21. The image analyzing unit subjects picked-up images picked up by the cameras 27 to image analysis processing and detects a type of the input device (the input means) that touches the touch panel 21 and a contact position coordinate.

For example, the image analyzing unit can discriminate whether the input device 26 is the pen or the finger with the thickness of a picked-up detection target set as a threshold. In this case, the input device 26 does not always have to touch the display unit, i.e., the touch panel 21.

Next, input-means determination processing in a case in which the image sensor is applied to the present invention (see FIG. 15) is explained.

Figure 17:
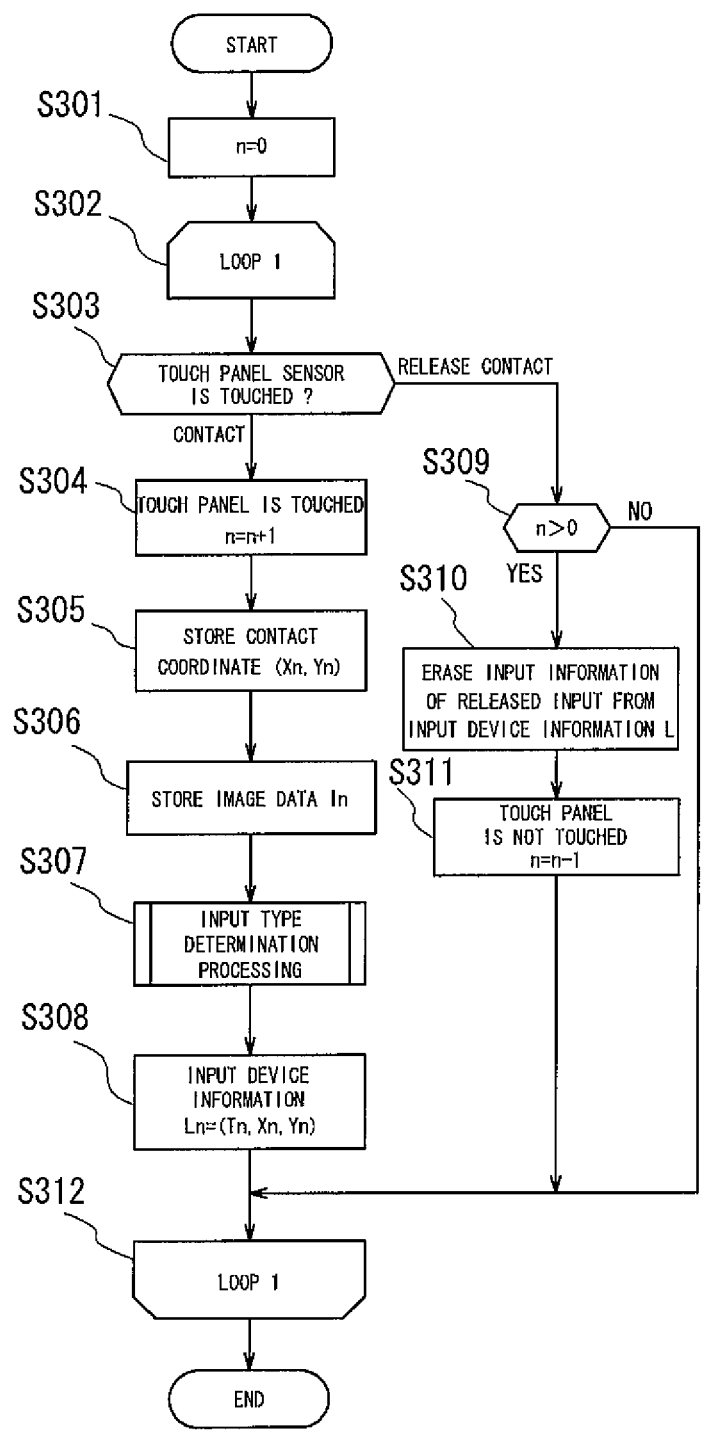
FIG. 17 is a flowchart showing a flow of processing for determining an input state.

FIG. 17 is a flowchart showing a flow of processing for determining an input state. As shown in FIG. 17, first, when the portable terminal 20 is activated by power supply or the like, the control unit 25 initializes a counter "n" for counting an input detection place in the touch panel 21 (n=0) (step S301). Thereafter, the control unit 25 determines whether the image sensor detects contact with the touch panel 21 (step S303). As a result of the determination, when the image sensor detects contact with the touch panel 21 (YES), the control unit 25 increments the counter "n" for counting the number of input detection places in the touch panel 21 (n=n+1) (step S304).

After incrementing the counter "n", the control unit 25 stores a contact position coordinate (Xn, Yn) (step S305) and further stores image data In of the input device 26 that touches the touch panel 21 (step S306). Thereafter, the control unit 25 performs input type determination processing for determining an input device on the basis of the stored image data In (step S307). Further, the control unit 25 determines, on the basis of the stored contact position coordinate (Xn, Yn) and an input device (Tn) determined by the input type determination processing, input device information Ln (Ln=(Tn,Xn,Yn)) indicating an input state (step S308).

On the other hand, as a result of the determination in step S303, when the image sensor does not detect contact (NO), i.e., in a case of contact release for releasing the pen or the finger from the touch panel 21, the control unit 25 determines whether the counter "n" is larger than 0 (n>0) (step S309). As a result of the determination, when the counter "n" is larger than 0 (YES), the control unit 25 erases the input device information Ln stored in association with a contact-released input (step S310) and decrements the counter "n" for counting the number of input detection places in the touch panel 21 (n=n−1) (step S311).

Figure 18:
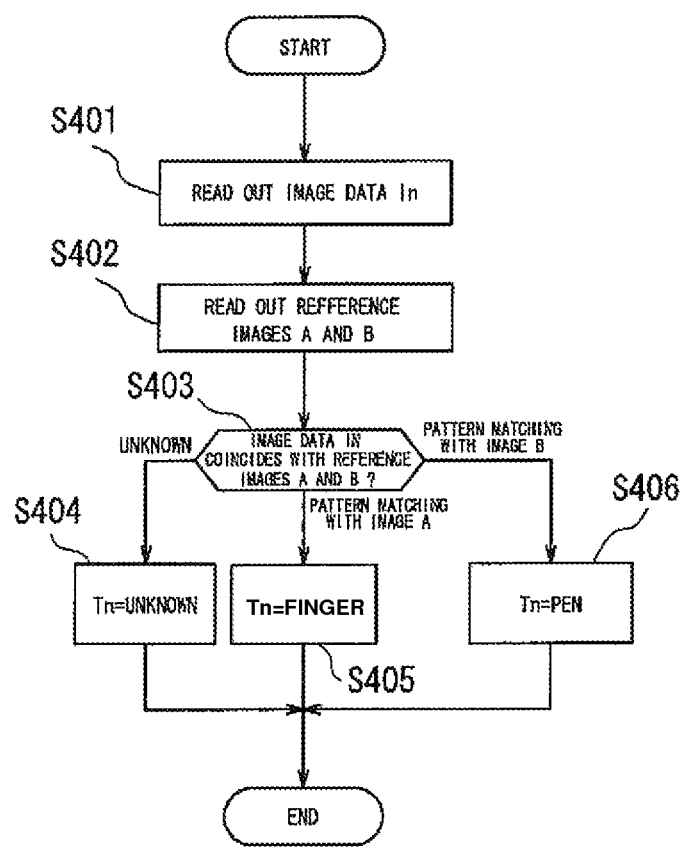
FIG. 18 is a flowchart showing a flow of processing for determining an input type in FIG. 17.

FIG. 18 is a flowchart showing a flow of processing for determining an input type in FIG. 17. As shown in FIG. 18, first, the control unit 25 reads out the stored image data In (step S401). Subsequently, the control unit 25 reads out reference images A and B (step S402). The reference image A is an image pattern of a finger and the reference image B is an image pattern of a pen.

After reading out the reference images A and B, the control unit 25 determines whether the reference images A and B and the image data In coincide with each other (are substantially the same), i.e., whether the image data In and the image patterns match (step S403). As a result of the determination, when the image data In does not match both the reference images A and B (UNKNOWN), the control unit 25 determines that the input means Tn is unknown (Tn=UNKNOWN) (step S404). When the image data In matches the reference image A, the control unit 25 determines that the input means Tn is a finger (Tn=FINGER) (step S405). When the image data In matches the reference image B, the control unit 25 determines that the input means Tn is a pen (Tn=PEN) (step S406).

Figure 19:
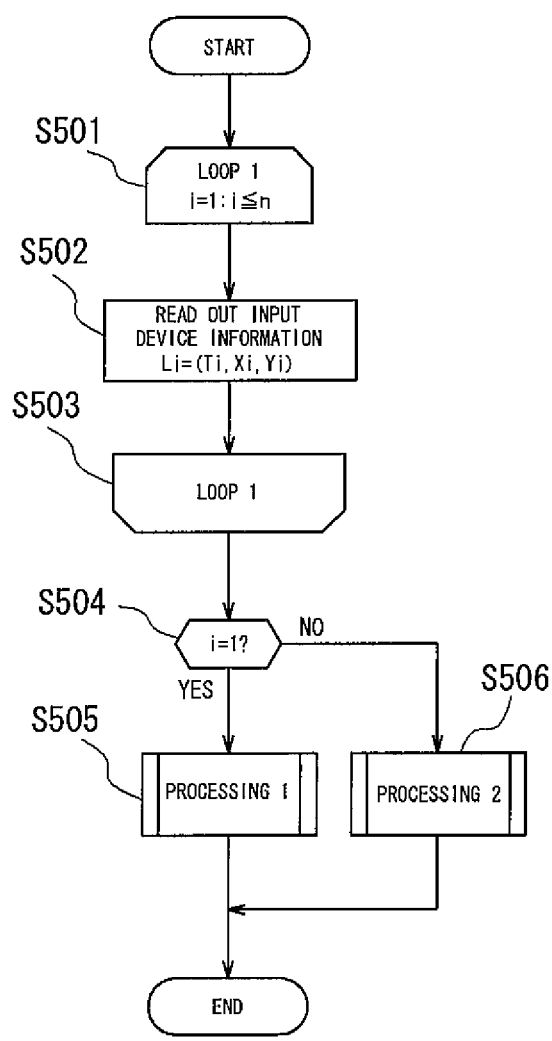
FIG. 19 is a flowchart showing a flow of processing for controlling an object.

FIG. 19 is a flowchart showing a flow of processing for controlling an object. As shown in FIG. 19, first, the control unit 25 reads out the input device information Li (Li=(Ti, Xi,Yi)) equivalent to the detected number of input places (i=1: i≤n) (steps S501 to S503). Thereafter, the control unit 25 determines whether i=1, i.e., an input place is one (step S504). As a result of the determination, when i=1 (YES), the control unit 25 performs processing 1 (step S505). On the other hand, when i is not 1 (NO), the control unit 25 performs processing 2 (step S506).

Figure 20:
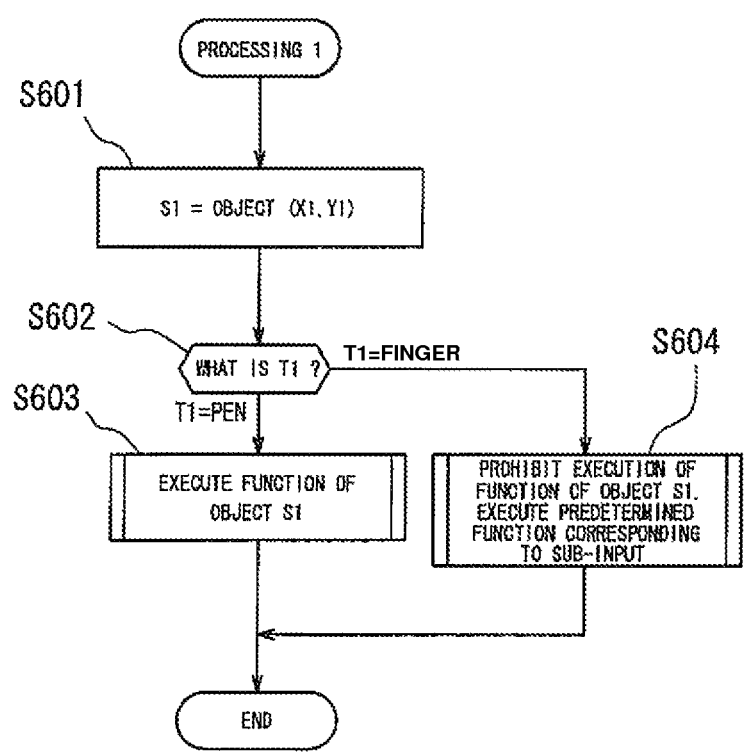
FIG. 20 is a flowchart showing a flow of processing of processing 1 in FIG. 19.

FIG. 20 is a flowchart showing a flow of processing of the processing 1 in FIG. 19. This processing 1 is processing performed when there is one detected input (i.e., i=1). As shown in FIG. 20, first, the control unit 25 sets, on the basis of the input device information L1, an object present in a coordinate (X1, Y1) as S1=object (X1, Y1) (step S601) and determines what is the input means (T1) (step S602). As a result of the determination, when the input means is a pen (T1=PEN), i.e., the main input, the control unit 25 executes a function of an object S1 (step S603). When the input means is a finger (T1=FINGER), i.e., the sub-input, the control unit 25 prohibits the execution of the function of the object S1 and executes, on the basis of the sub-input, a predetermined function not allocated in advance on the application screen (step S604).

Figure 21:
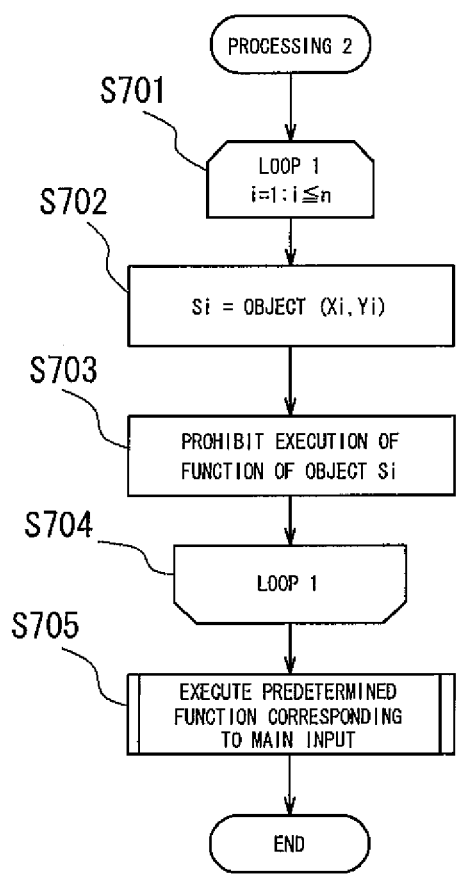
FIG. 21 is a flowchart showing a flow of processing of processing 2 in FIG. 19.

FIG. 21 is a flowchart showing a flow of processing of the processing 2 in FIG. 19. This processing 2 is performed when there are two or more detected inputs (i.e., i>1). As shown in FIG. 21, the control unit 25 prohibits execution of the object Si=an object (Xi, Yi) specified for each piece of the read-out input device information Li (steps S701 to S704). Thereafter, the control unit 25 executes, on the basis of a pen input (T1=PEN), i.e., the main input, a predetermined function not allocated on the application screen in advance (S705).

In the processing for determining an input state at the time when the touch panel 21 is touched (see FIG. 17), the control unit 25 stores a coordinate of a position where the touch panel 21 is touched and stores, using the image sensor, an image data of a body that touches the touch panel 21. In the processing for determining an input type (see FIG. 18), the control unit 25 performs matching of the stored image data and the reference data (the image patterns of the finger and the pen) stored in advance and performs determination of input means. The control unit 25 stores a result of the determination as a list Ln together with an input position. In the processing for controlling an object (see FIG. 19), the control unit 25 performs, on the basis of the result of the input means determination, operation control for an object displayed according to the input means. The control unit 25 switches processing of an application between a case in which there are plural inputs and a case in which there is one input.

The control unit 25 executes, when it is determined by the input detecting unit (the touch panel 21) that an input to the display unit is the first input by the first input means (the main input means (the pen)), on the basis of the first input, a function of an application allocated in advance to an area on the screen of the application specified by the first input. The control unit 25 prohibits, when it is detected by the input detecting unit that the input to the display unit is the second input by the second input means (the sub-input means (the finger)), the execution of the function of the application allocated in advance on the screen of the application and executes, on the basis of the second input, a predetermined function not allocated to the area on the screen of the application.

The control unit 25 executes, when the first input is detected during a period in which the second input continues, on the basis of the first input, the predetermined function not allocated to the area on the screen of the application.

When one main application, a screen of which is displayed on the display unit, and at least one background application, a screen of which is not displayed on the display unit, are simultaneously activated, the control unit 25 executes, when it is detected by the input detecting unit that the input to the display unit is the first input by the first input means, on the basis of the first input, a function of a main application allocated in advance to an area on the screen of the main application specified by the first input. The control unit 25 prohibits, when it is detected by the input detecting unit that the input to the display unit is the second input by the second input means, the execution of the function of the main application allocated in advance to the screen of the main application and executes, on the basis of the second input, a predetermined function of the background application.

The input detecting unit includes the cameras (the imaging unit) 27 that pick up images of the periphery of the display unit and the image analyzing unit for analyzing images picked up by the cameras or includes the image sensor incorporated in the display unit and the image analyzing unit for analyzing images output from the image sensor.

Therefore, when the present invention is used, it is possible to realize multifunctional operations in a limited display space using general input means without increasing the number of kinds of operation for realizing a purpose in the email application employing the touch panel.

Effects explained below are generated by using the present invention.

First, since screen operation such as scroll can be applied to the touch panel by the sub-input means, for example, it is unnecessary to switch display to view a reception mail, it is unnecessary to provide a display area for soft keys, it is possible to effectively use a narrow space, and the number of kinds of operation by the user is reduced.

Since the input means for input to the touch panel is determined, wrong operation of an object does not occur in the sub-input means.

Since the input means in contact with the touch panel is recognized to change an operation for the touch panel, special hardware is unnecessary. A switching operation and the like for the input means are not performed.

As explained above, the portable terminal according to the present invention includes the storing unit (the storing unit) that stores various applications, the display unit (the display unit) that displays a screen of each of the applications, the input detecting unit (the input detecting unit) that detects each of plural inputs to the display unit, and the control unit (the control unit) that executes, when it is detected by the input detecting unit that an input to the display unit is the first input by the first input means (the main input means (the pen)), on the basis of the first input, a function of the application allocated in advance to an area on the screen of the application specified by the first input, and prohibits, when it is detected by the input detecting unit that an input to the display unit is the second input by the second input means (the sub-input means (the finger)), the execution of the function of the application allocated in advance on the screen of the application and executes, on the basis of the second input, a predetermined function not allocated to the area on the screen of the application.

Third Embodiment

In a third embodiment of the present invention, operations of the present invention in a mail application are explained. Components and actions of a portable terminal according to the third embodiment are the same as those of the portable terminal 1 (see FIG. 1) according to the first embodiment in which an example of the application to the WEB browser is explained.

Figure 22:
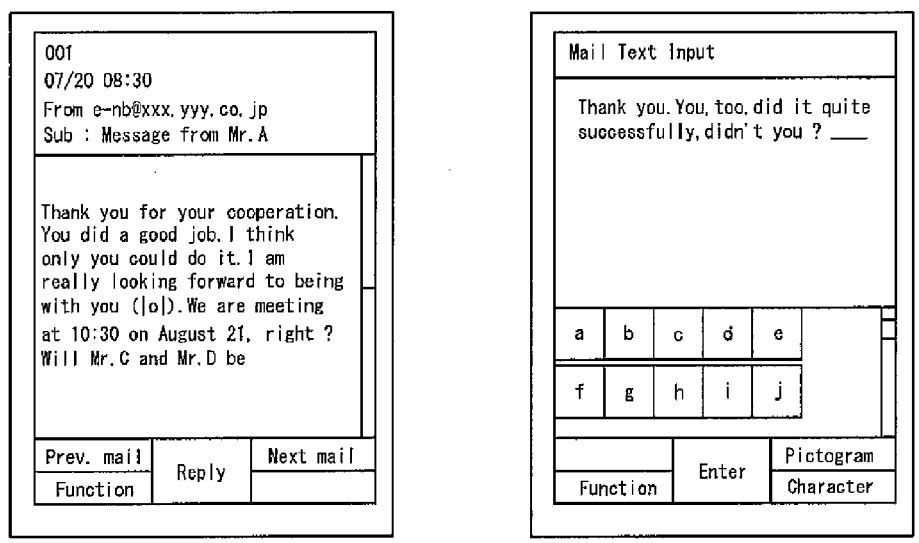
FIG. 22 is an explanatory diagram showing an operation (No. 1) of the present invention in a mail application.
Figure 23:
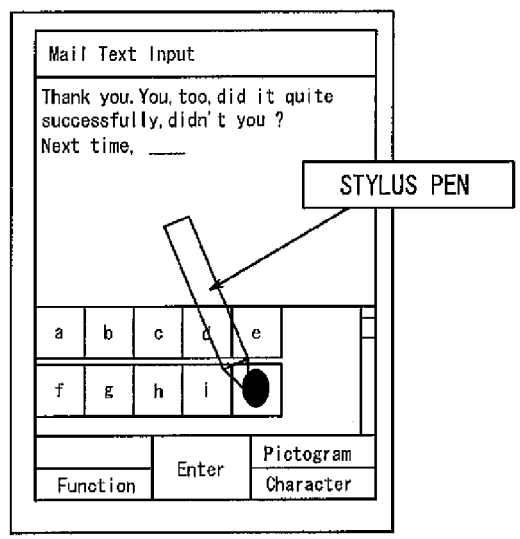
FIG. 23 is an explanatory diagram showing an operation (No. 2) of the present invention in the mail application.
Figure 24:
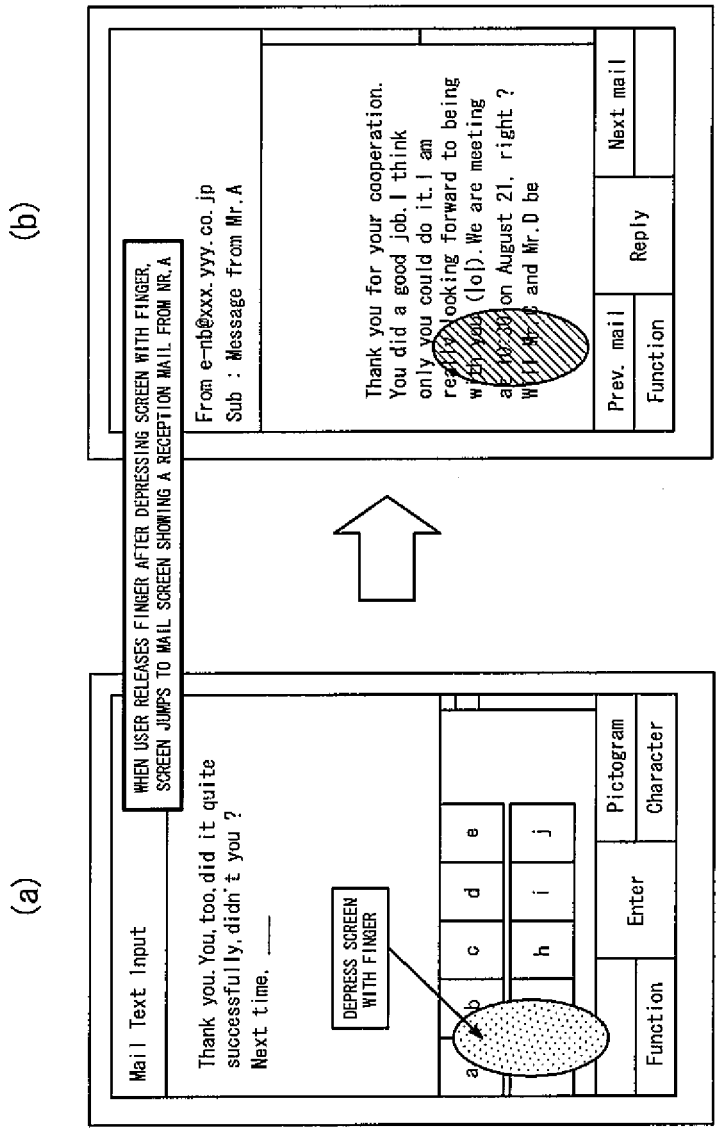
FIG. 24 shows an operation (No. 3) of the present invention in the mail application, wherein (a) is an explanatory diagram of a mail input screen and (b) is an explanatory diagram of a reception mail screen.
Figure 25:
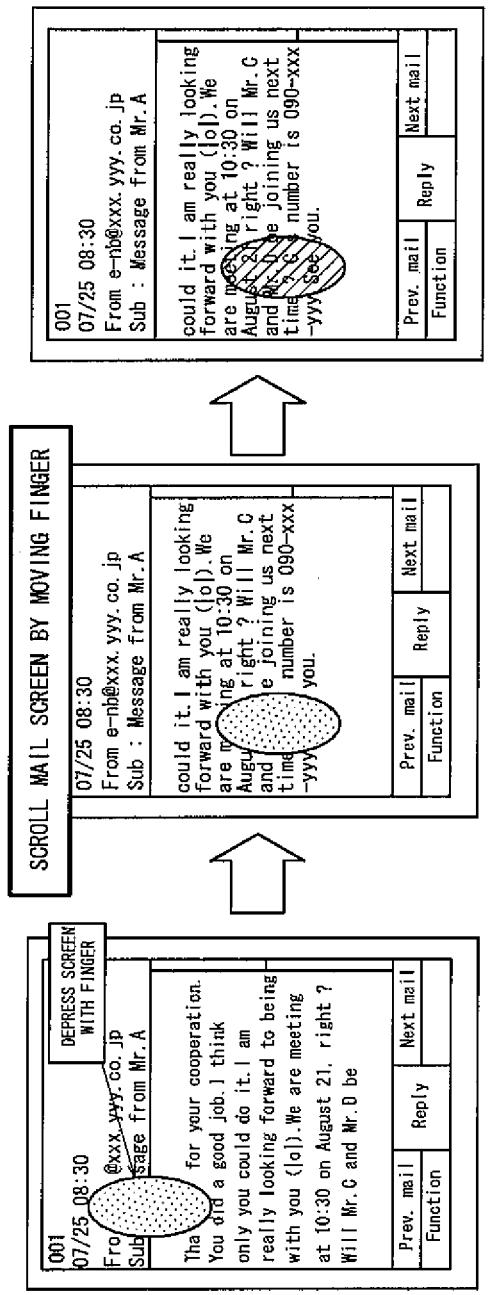
FIG. 25 is an explanatory diagram of a screen scroll showing an operation (No. 4) of the present invention in the mail application.

FIG. 22 is an explanatory diagram showing an operation (No. 1) of the present invention in the mail application. FIG. 23 is an explanatory diagram showing an operation (No. 2) of the present invention in the mail application. FIG. 24 shows an operation (No. 3) of the present invention in the mail application, wherein (a) is an explanatory diagram of a mail input screen and (b) is an explanatory diagram of a reception mail screen. FIG. 25 is an explanatory diagram of screen scroll showing an operation (No. 4) of the present invention in the mail application.

Figure 26:
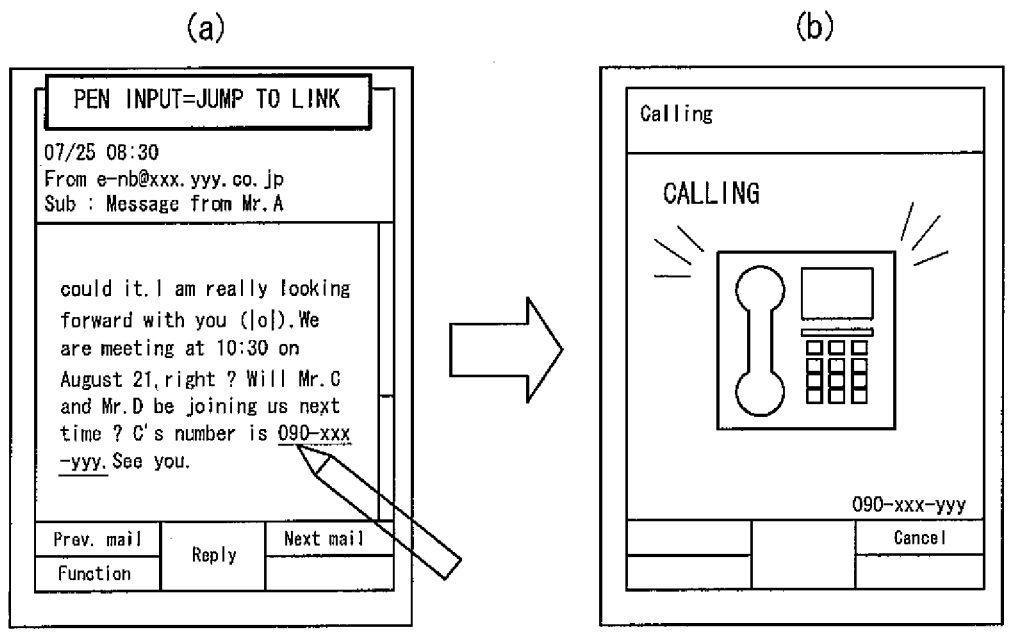
FIG. 26 shows an operation (No. 5) of the present invention in the mail application, wherein (a) is an explanatory diagram of a reception mail viewing screen and (b) is an explanatory diagram of a calling mode screen.
Figure 27:
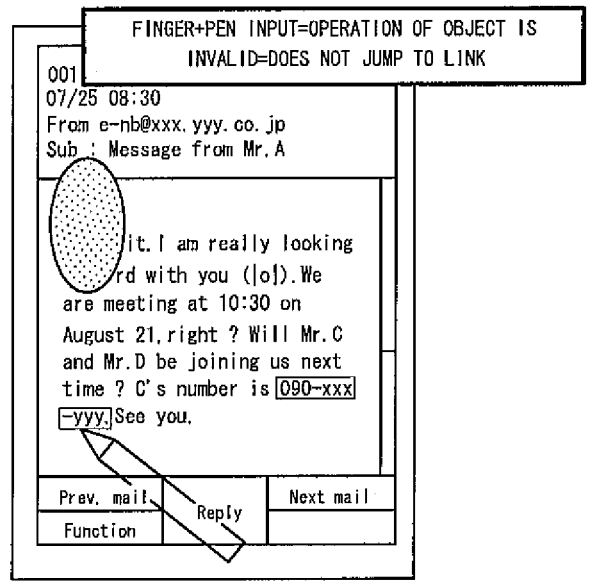
FIG. 27 is an explanatory diagram of screen transition states showing an operation (No. 6) of the present invention in the mail application.
Figure 28:
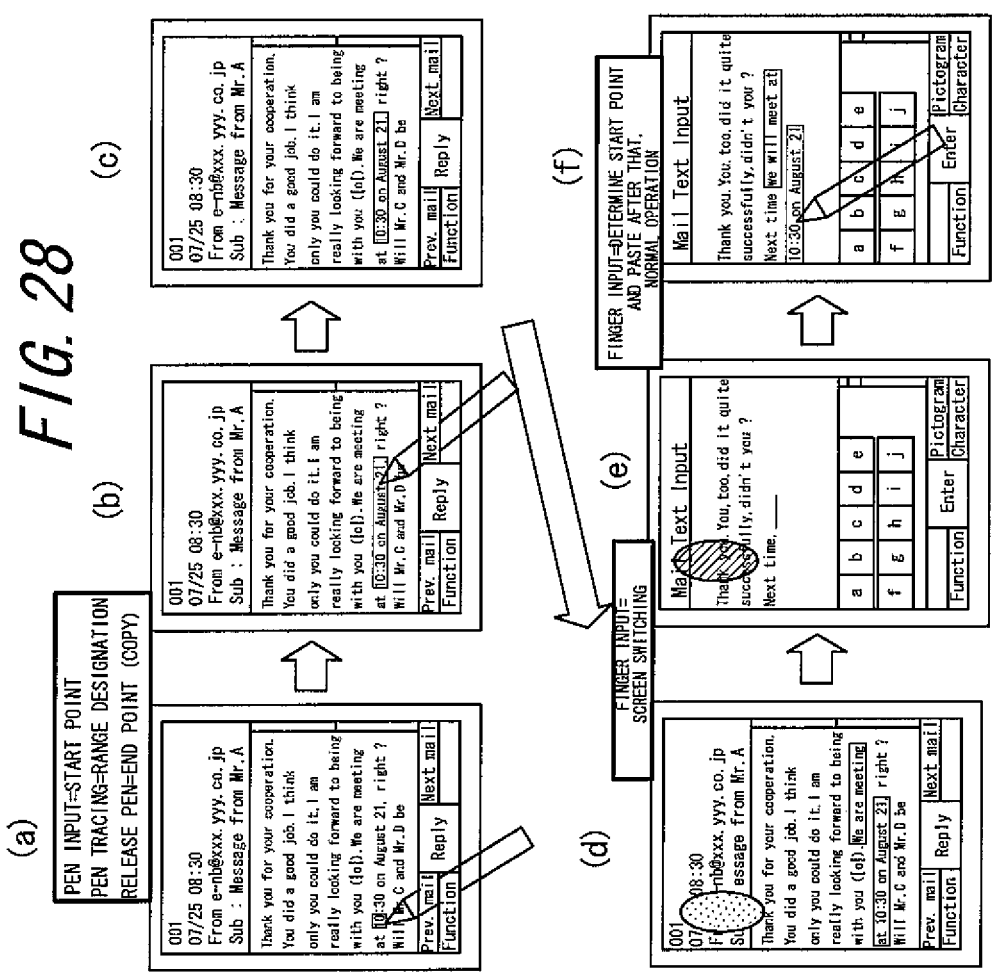
FIG. 28 is an explanatory diagram of screen transition states (a) to (f) showing an operation (No. 7) of the present invention in the mail application.
Figure 29:
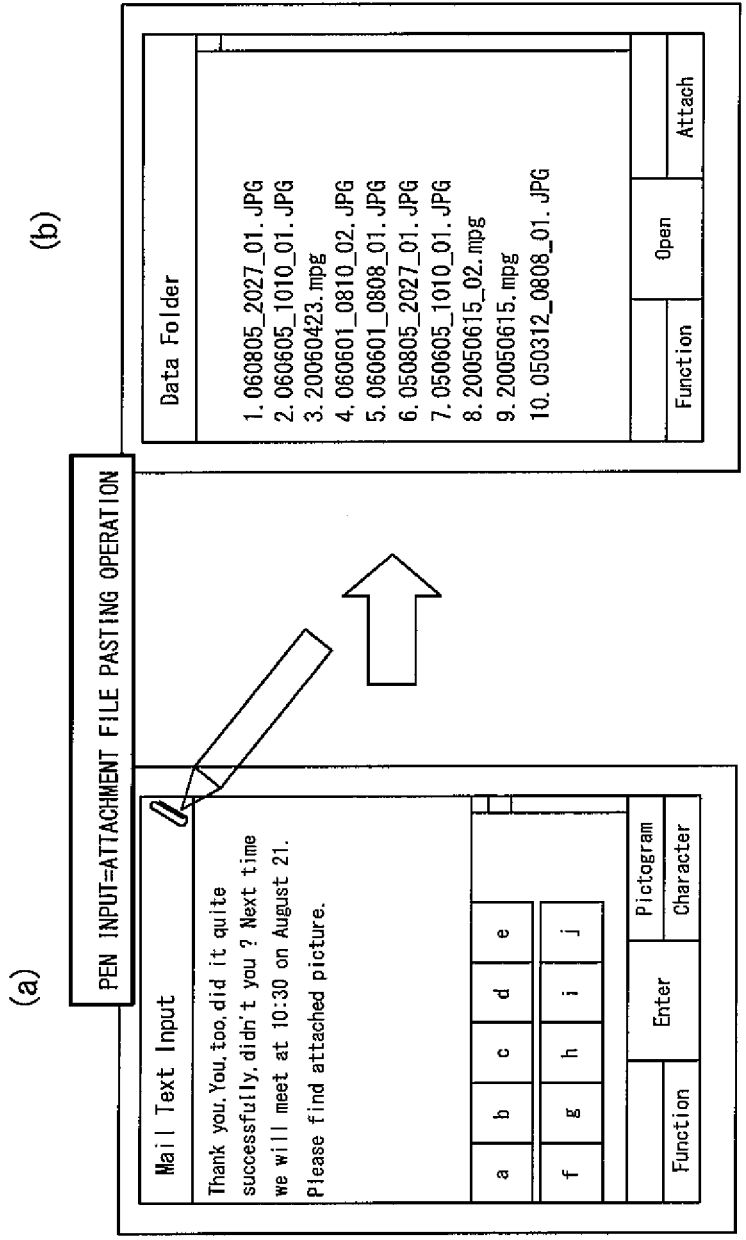
FIG. 29 shows an operation (No. 8) of the present invention in the mail application, wherein (a) is an explanatory diagram of an attachment file pasting screen and (b) is an explanatory diagram of an attachment file selection screen.
Figure 30:
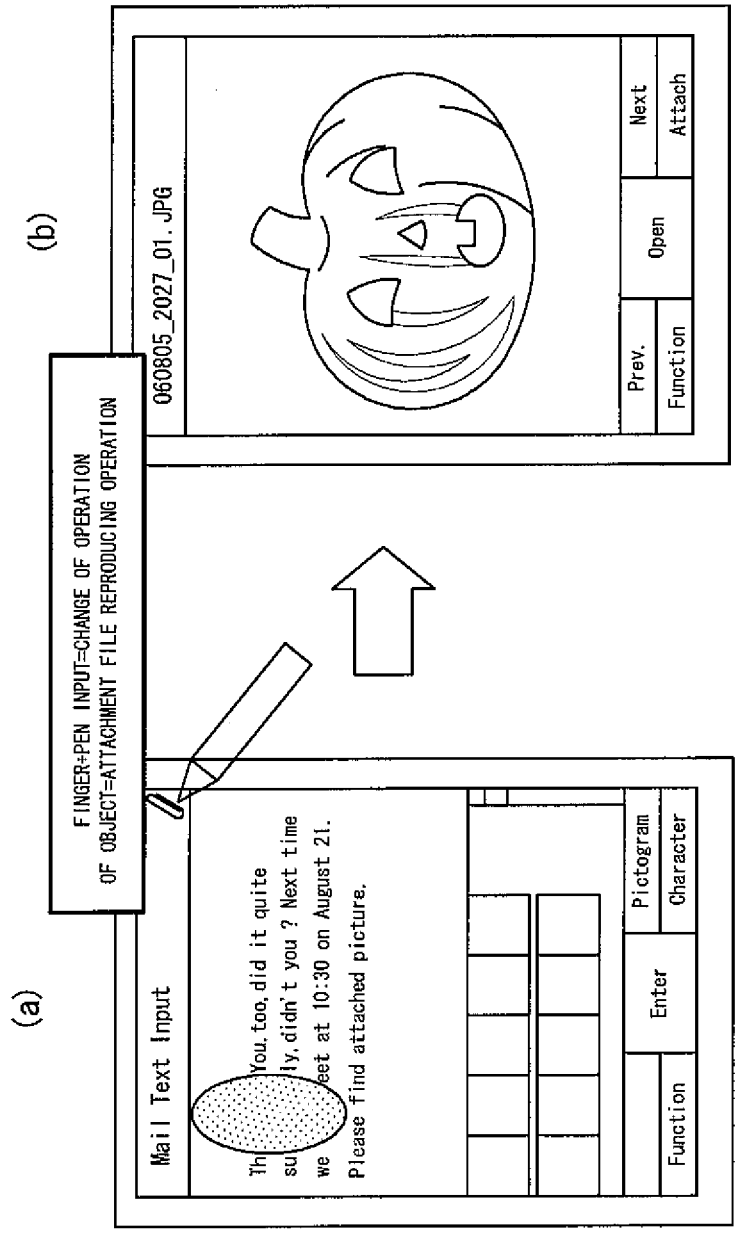
FIG. 30 shows an operation (No. 9) of the present invention in the mail application, wherein (a) is an explanatory diagram of a pen input screen and (b) is an explanatory diagram of a file reproduction screen.

FIG. 26 shows an operation (No. 5) of the present invention in the mail application, wherein (a) is an explanatory diagram of a reception mail viewing screen and (b) is an explanatory diagram of a calling mode screen. FIG. 27 is an explanatory diagram of screen transition states showing an operation (No. 6) of the present invention in the mail application. FIG. 28 is an explanatory diagram of screen transition states (a) to (f) showing an operation (No. 7) of the present invention in the mail application. FIG. 29 shows an operation (No. 8) of the present invention in the mail application, wherein (a) is an explanatory diagram of an attachment file pasting screen and (b) is an explanatory diagram of an attachment file selection screen. FIG. 30 shows an operation (No. 9) of the present invention in the mail application, wherein (a) is an explanatory diagram of a pen input screen and (b) is an explanatory diagram of a file reproduction screen.

In the mail application (hereinafter referred to as "mailer") shown in FIG. 22, a switching function for a reception mail and a return mail corresponding to the reception mail and a scroll function for a mail screen are allocated to the sub-input.

In FIG. 22, a reception mail from Mr. A is shown on the left side and a creation screen for a return mail responding to the reception mail is shown on the right side. FIG. 23 shows a state in which mail creation is performed on the creation screen for a return mail shown in FIG. 22. In FIG. 23, mail creation employing a function of an object displayed on a screen of the mailer, i.e., normal mail creation is performed by the pen input as the main input.

As shown in FIG. 24, a user can switch a mail creation screen (see (a)) to a reception mail from Mr. A (see (b)) by depressing the screen with a finger during mail creation and releasing the finger in substantially the same position. In this case, the portable terminal 20 performs switching of the screen by using information indicating that an input position of an input to the touch panel 5 by the finger and a release position are substantially the same.

A scene in which the user performs screen scroll by moving the finger while keeping the screen depressed by the finger is shown in FIG. 25. In this case, the portable terminal 20 performs, by using information indicating that an input position of an input to the touch panel 5 by the finger and a release position are different, a scroll operation without performing the switching of the screen. As shown in FIG. 25, the switching of the screen is not performed even if the user releases the finger after the scroll.

As shown in FIG. 26, when there is link in a screen on which the reception mail from Mr. A is viewed (see (a)), usually, when the user touches a link portion with the pen, the screen transitions to a link destination. In FIG. 26, when the user touches a telephone number with the pen, the portable terminal 20 is switched to a calling mode for this telephone number (see (b)). On the other hand, as shown in FIG. 27, when the user touches the link portion with the pen in a state in which the user depresses the screen with the finger, the screen does not jump to the link destination and a range designation is performed. A function displayed on the screen by the sub-input (in this case, the link) is prohibited. When the main input is performed in that state (during sub-input), a function not displayed on the screen (in this case, the range designation) is executed.

A scene in which the user performs copying in order to cite a character string of a reception mail is shown in FIG. 28. In this case, a start position of the pen input is a start position of the range designation and a position where the pen is released is an end position of the range designation. A character string range-designated by the pen input is stored until a paste operation is performed. After the range is designated as shown in FIGS. 28(a) to 28(c) and the user copies the designated range, as shown in FIGS. 28(d) and 28(e), the user performs switching to the mail creation screen with the finger input. As shown in FIG. 28(f), the user pastes, with the pen input, copied contents on a mail creation screen at a switching destination. When the pen input is detected on the mail creation screen in a state in which the character string to be copied is stored, an input position of the pen input is set as a paste start position and pasting of the character string is performed. After the paste, the portable terminal 20 returns to the normal operation.

A scene in which the user is about to attach an attachment file to a mail is shown in FIG. 29. In this case, after depressing, with the pen, an icon for attaching an attachment file (see (a)), the user invokes a data folder and selects a file to be attached (see (b)). When the user performs the pen input in a state in which the user depresses the screen with the finger as shown in FIG. 30 (see (a)), the attached file is reproduced (see (b)).

According to the embodiments explained above, the input means (the pen or the finger) for input to the touch panel is determined and functions to be executed are distinguished according to the main input, the sub-input, and a combination of these inputs. Therefore, since special hardware is unnecessary and a switching operation and the like for the input device are not performed, the user can perform intuitive operation with less wrong operation in a limited space. In particular, when the mail application is used as in the present invention, it is possible to realize, without requiring a special apparatus, a reception mail viewing operation and a scroll operation realized by allocating special keys and by plural times of menu operation as in the past.

The present invention is not limited to the embodiments and various alterations and modifications are possible. For example, the embodiments are explained by using the sensor of the surface elastic type as the touch sensor. However, the present invention can also be realized by using a touch sensor of a sensor type. The embodiments explained by using the PDA as an example. However, the present invention can be widely applied to portable radio terminals such as a cellular phone and portable terminals such as a portable game machine, a portable audio player, a portable video player, a portable electronic dictionary, and a portable electronic book viewer. Further, a case in which the main input is the pen and the sub-input is the finger is explained. However, the present invention can also be applied to a case in which the main input is the finger and the sub-input is the pen. The present invention can also be applied to a case in which the number of inputs is equal to or larger than three.

CROSS REFERENCE TO RELATED APPLICATION

The present application claims the benefit of priority from Japanese Patent Application No. 2006-265060 (filed on Sep. 28, 2006), Japanese Patent Application No. 2006-264866 (filed on Sep. 28, 2006), and Japanese Patent Application No. 2007-106200 (filed on Apr. 13, 2007); the entire contents of which are incorporated herein by reference.

The invention claimed is:

1. A portable device comprising:
a storing unit configured to store various applications including a first application;
a display unit configured to display a screen of each of the applications;
an input detecting unit configured to detect each of plural inputs touched onto the screen, the plural inputs including a first single input by a first input means and a second single input by a second input means; and
a control unit configured to execute a function in response to one of the plural inputs, wherein
the control unit executes a first function in response to the first single input touched onto a link object displayed on a first screen of the first application,
the first function is assigned to the link object,
the control unit executes, when the first single input is not detected, a second function in response to the second single input by the second input means touched onto the link object displayed on the first screen,
the control unit does not execute, when the first single input is detected, the second function in response to the second single input touched onto the link object displayed on the first screen, and
the second function is not assigned to the link object.

2. The portable terminal according to claim 1 wherein the first input means is a finger, and the second input means is a pen.

3. A control method for a portable device including:
a storing unit configured to store various applications including a first application;
a display unit configured to display a screen of each of the applications; and
an input detecting unit configured to detect each of plural inputs touched onto the screen, the plural inputs including a first single input by a first input means and a second single input by a second input means; wherein,
the control method comprises:
executing a first function in response to the first single input by the first input means touched onto a link object displayed on a first screen of the first application, the first function being assigned to the link object;
executing, when the first single input is not detected, a second function in response to the second single input by the second input means touched onto the link object displayed on the first screen; and
not executing, when the first single input is detected, the second function in response to the second single input touched onto the link object displayed on the first screen, the second function not being assigned to the link object.

4. A portable device comprising:
a storing unit configured to store various applications including a first application;
a display unit configured to display a screen of each of the applications;
an input detecting unit configured to detect each of plural inputs touched onto the screen, the plural inputs including a first single input by a first input means and a second single input by a second input means; and
a control unit configured to execute a function in response to one of the plural inputs, wherein
the control unit executes a first function in response to the first single input touched onto a link object displayed on a first screen of the first application,
the first function is assigned to the link object,
the control unit executes, when the first single input is not detected, a second function in response to the second single input by the second input means touched onto the link object displayed on the first screen,
the control unit does not execute, when the first single input is being detected, the second function in response to the second single input touched onto the link object displayed on the first screen, and
the second function is not assigned to the link object.

* * * * *